United States Patent
Hagiwara et al.

(10) Patent No.: US 9,407,900 B2
(45) Date of Patent: Aug. 2, 2016

(54) IMAGE ENCODING METHOD AND IMAGE ENCODING APPARATUS

(71) Applicant: SOCIONEXT INC., Yokohama-shi, Kanagawa (JP)

(72) Inventors: Soichi Hagiwara, Komae (JP); Naoki Sakamoto, Yokohama (JP)

(73) Assignee: SOCIONEXT INC., Yokohama (JP)

( * ) Notice: Subject to any disclaimer, the term of this patent is extended or adjusted under 35 U.S.C. 154(b) by 0 days.

(21) Appl. No.: 14/848,093

(22) Filed: Sep. 8, 2015

(65) Prior Publication Data

US 2016/0073083 A1 Mar. 10, 2016

(30) Foreign Application Priority Data

Sep. 10, 2014 (JP) .................................. 2014-184296

(51) Int. Cl.
- *H04N 13/00* (2006.01)
- *H04N 13/02* (2006.01)
- *H04N 13/04* (2006.01)

(52) U.S. Cl.
CPC ....... *H04N 13/0048* (2013.01); *H04N 13/0011* (2013.01); *H04N 13/0022* (2013.01); *H04N 13/0242* (2013.01); *H04N 13/0282* (2013.01); *H04N 13/0477* (2013.01); *H04N 13/0481* (2013.01); *H04N 2013/0092* (2013.01)

(58) Field of Classification Search
None
See application file for complete search history.

(56) References Cited

U.S. PATENT DOCUMENTS

| | | | | |
|---|---|---|---|---|
| 4,704,627 A | * | 11/1987 | Yuyama | .................. H04N 13/00 348/42 |
| 2008/0112616 A1 | * | 5/2008 | Koo | ................... H04N 13/0022 382/171 |
| 2011/0292186 A1 | * | 12/2011 | Okuda | .................. G06T 7/0022 348/51 |
| 2011/0293172 A1 | * | 12/2011 | Sakamoto | .......... H04N 13/0033 382/154 |
| 2011/0298904 A1 | * | 12/2011 | Okuda | ............... H04N 13/0022 348/51 |
| 2012/0321171 A1 | * | 12/2012 | Ito | ...................... H04N 13/0011 382/154 |
| 2013/0016898 A1 | * | 1/2013 | Tchoukaleysky | .. H04N 13/0066 382/154 |

(Continued)

FOREIGN PATENT DOCUMENTS

| | | |
|---|---|---|
| JP | 09-027969 A | 1/1997 |
| JP | 2001-256482 A | 9/2001 |

(Continued)

OTHER PUBLICATIONS

Extended European Search Report of European Patent Application No. 15183774.7 dated Feb. 1, 2016.

(Continued)

*Primary Examiner* — Sean Motsinger
(74) *Attorney, Agent, or Firm* — Arent Fox LLP

(57) ABSTRACT

An image encoding method for an encoding system includes receiving a first image captured by a main camera and a second image captured by a sub camera provided in the same plane; comparing pixel values of pixels at first coordinates of each of the first and second images to obtain a first difference value; determining the first coordinates are in surface or back region in case of the first difference value is not more than or more than a first threshold value; pixel-shifting the second image by a first shift amount; and comparing the pixel value at the first coordinates of the first image with that of the second image after the pixel shift to obtain a second difference value, determining whether the first coordinates are in the surface or back region based on the second difference value, and recording into a second frame different from the first frame.

10 Claims, 31 Drawing Sheets

(56) References Cited

U.S. PATENT DOCUMENTS

| | | | | |
|---|---|---|---|---|
| 2013/0050412 | A1* | 2/2013 | Shinohara | H04N 13/0022 348/42 |
| 2013/0163855 | A1* | 6/2013 | Mathur | G06T 7/0075 382/154 |
| 2014/0002603 | A1* | 1/2014 | Takahashi | H04N 13/0007 348/43 |
| 2014/0028794 | A1* | 1/2014 | Wu | H04N 13/004 348/43 |
| 2014/0327736 | A1* | 11/2014 | DeJohn | H04N 13/0022 348/43 |
| 2015/0092023 | A1* | 4/2015 | Asakura | H04N 13/0217 348/49 |
| 2015/0179218 | A1* | 6/2015 | Nadler | G11B 27/028 382/154 |
| 2015/0245062 | A1* | 8/2015 | Shimizu | H04N 19/597 375/240.15 |
| 2015/0296219 | A1* | 10/2015 | Yu | H04N 19/597 375/240.12 |
| 2015/0304633 | A1* | 10/2015 | Inoue | H04N 13/0207 348/46 |
| 2015/0341614 | A1* | 11/2015 | Senoh | H04N 19/597 348/43 |

FOREIGN PATENT DOCUMENTS

| | | | |
|---|---|---|---|
| JP | 2004-152133 | A | 5/2004 |
| JP | 2007-334583 | A | 12/2007 |
| JP | 2009-251141 | A | 10/2009 |
| JP | 2013-046263 | A | 3/2013 |

OTHER PUBLICATIONS

Masayuki Tanimoto et al., "International Standard Technology for Practical Use of Free-viewpoint Television," ICT Innovation Forum 2013, Oct. 1, 2013, pp. 1-2.

Mehrdad Tehrani et al., "Use Cases and Requirements on Free-viewpoint Television (FTV)," ISO/IEC/JTC1/SC29/WG11, MPEG2013/N14104, Oct. 2013, pp. 1-12.

Jun Arai et al, "Integral three-dimensional television with video system using pixel-offset method," Optics Express, Feb. 2013, vol. 21, No. 3, pp. 3474-3485.

* cited by examiner

FIG. 4
(a)
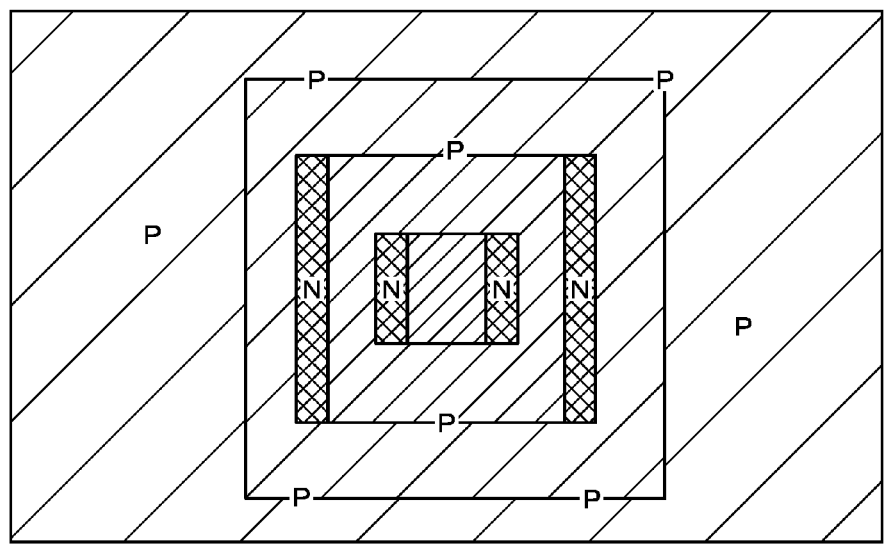
(b)
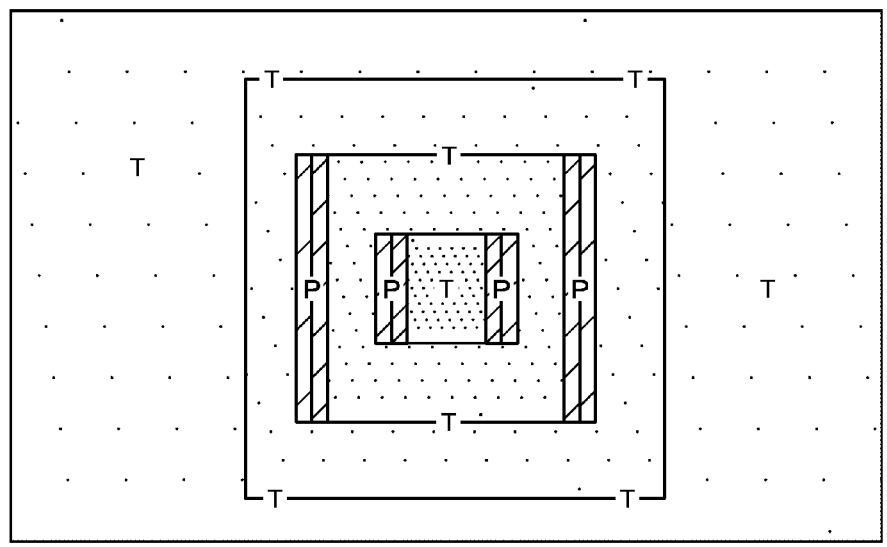

FIG. 6
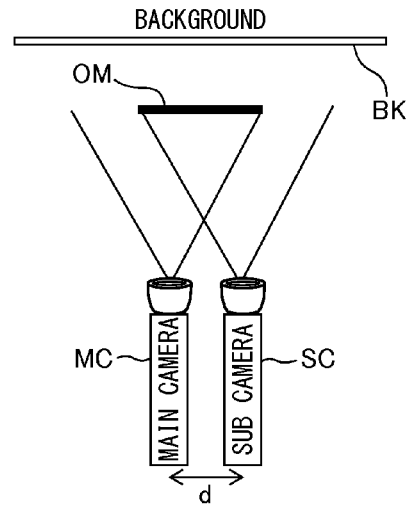
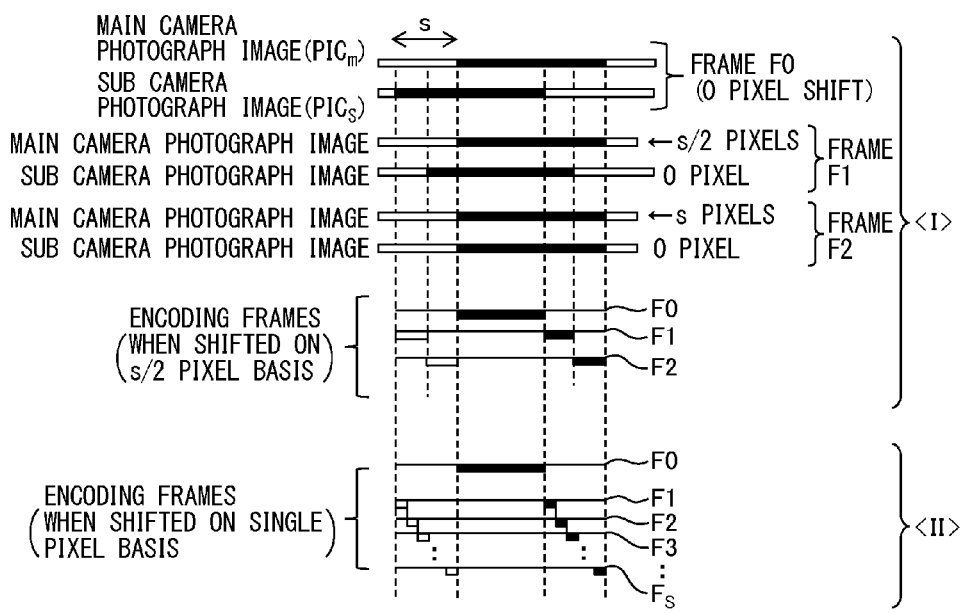

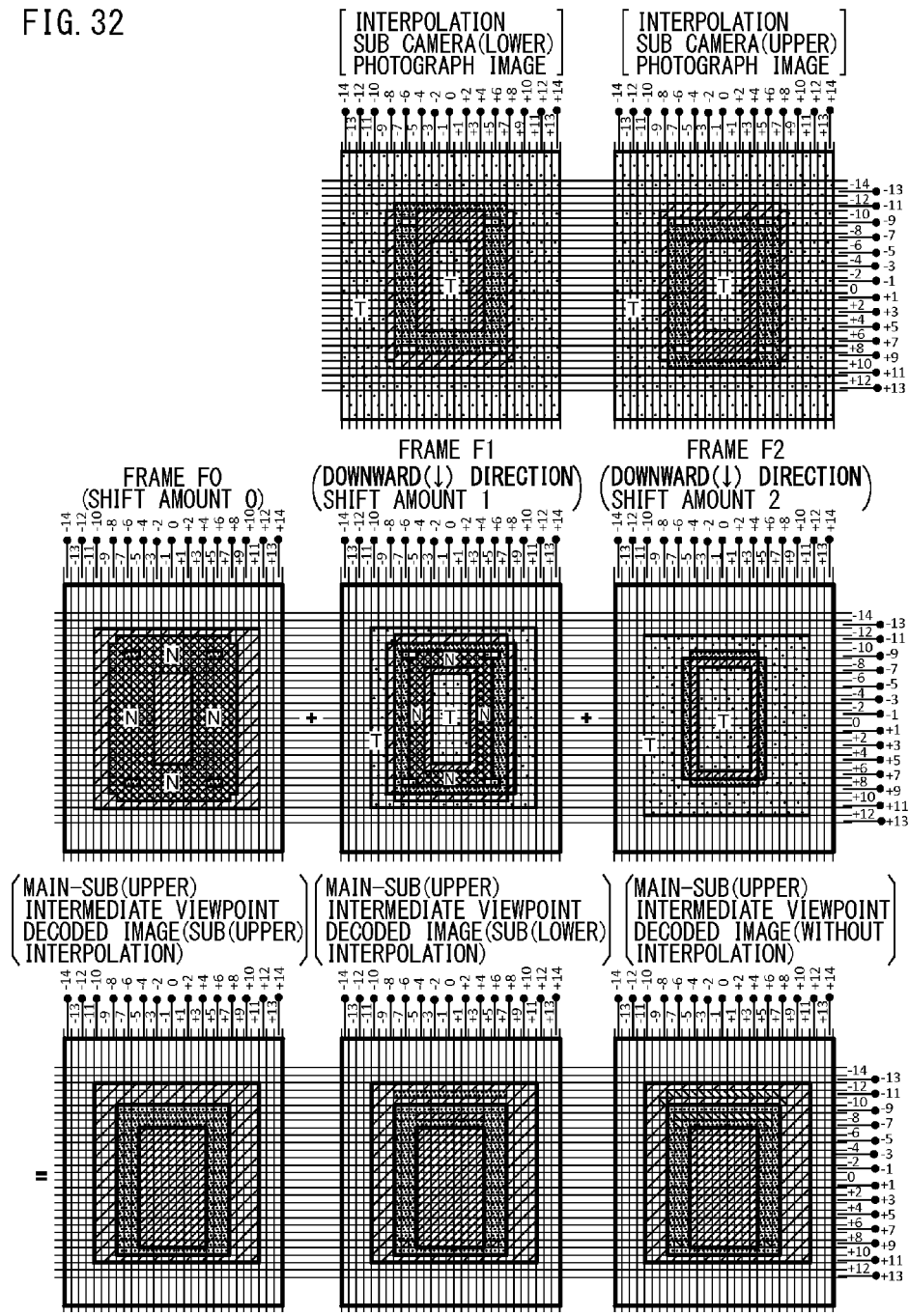

US 9,407,900 B2

IMAGE ENCODING METHOD AND IMAGE ENCODING APPARATUS

CROSS-REFERENCE TO RELATED APPLICATION

This application is based upon and claims the benefit of priority of the prior Japanese Patent Application No. 2014-184296, filed on Sep. 10, 2014, the entire contents of which are incorporated herein by reference.

FIELD

The embodiments discussed herein are related to an image encoding method and an image encoding apparatus.

BACKGROUND

In recent years, techniques for recording still images or moving images (video) of a three-dimensional space have been paid attention, and research is underway. However, there are various problems to be solved in order to encode and decode all information of a photographed (captured) three-dimensional space.

Thus, there have been proposed a minute viewpoint movement-adapted image that reduces technical barriers by limiting a viewpoint movement range to, for example, a typical TV-viewing range (a minute viewpoint movement range: a range where a viewer merely moves his or her head (performs a parallel movement), as well as image encoding and decoding techniques.

As described above, although various approaches have been proposed as techniques for encoding and decoding three-dimensional images, there are problems with the amount of calculation and the amount of data in encoding and decoding three-dimensional images even when assuming a minute viewpoint movement.

For example, in a proposed technique, cameras are located at the center, left, and right and, based on still images acquired from the center, left, and right cameras and a depth map thereof, there are recorded images and depths of only objects not included in a front image (a center image) among the center image and left and right viewpoints.

Then, when decoding, pixel shift according to each depth is performed by geometry calculation according to the amount of viewpoint movement of a viewer. Portions with a lack of pixel data due to the shift are interpolated using encoded data of the left and right images.

However, while this technique can, for example, reduce the amount of decoding data, geometry calculation is performed on encoded three-dimensional image information, thus resulting in an enormous amount of calculation.

In addition, for example, there has been proposed a technique in which a lens array and light collecting lenses are arranged on the entire surface of a high-precision camera sensor to encode all of moving images from respective viewpoint positions. When decoding, viewpoint movement may be made by performing a reverse procedure to a procedure at the time of encoding.

However, this technique does not use, for example, geometry calculation. Accordingly, while the technique may reduce the amount of calculation, it encodes a plurality of viewpoint images, thus using an enormous amount of encoding data.

As described above, even when specialized to a minute viewpoint movement range, although it is possible to reduce the amount of calculation and the amount of data as compared to encoding of all pieces of three-dimensional image information, it is still insufficient and there is imposed a very large load.

By the way, in the past, various approaches have conventionally been made for techniques for recording still images or moving images of three-dimensional spaces, i.e., techniques for encoding and decoding three-dimensional images.

Patent Document 1: Japanese Laid-open Patent Publication No. 2013-046263
Patent Document 2: Japanese Laid-open Patent Publication No. H09(1997)-027969
Patent Document 3: Japanese Laid-open Patent Publication No. 2009-251141
Patent Document 4: Japanese Laid-open Patent Publication No. 2001-256482
Patent Document 5: Japanese Laid-open Patent Publication No. 2004-152133
Patent Document 6: Japanese Laid-open Patent Publication No. 2007-334583
Non-Patent Document 1: Masayuki Tanimoto, "International Standard Technology for Practical Use of Free-viewpoint Television," ICT Innovation Forum 2013, Oct. 1, 2013
Non-Patent Document 2: Tehrani et al., "Use Cases and Requirements on Free-viewpoint Television (FTV)," ISO/IEC JTC1/SC29/WG11, MPEG2013/N14104, Oct. 2013
Non-Patent Document 3: Arai et al., "Integral three-dimensional television with video system using pixel-offset method," OPTICS EXPRESS, Vol. 21, No. 3, pp. 3474-3485, Feb. 2013

SUMMARY

According to an aspect of the embodiments, there is provided an image encoding method for an encoding system including receiving a first image captured by a main camera and a second image captured simultaneously with the first image by a sub camera provided in the same plane with the main camera; comparing pixel values of pixels at first coordinates of each of the first image and the second image to obtain a first difference value; and determining that the first coordinates are in a surface region in case of the first difference value is not more than a first threshold value, and that the coordinates are in a back region in case of the first difference value is more than the first threshold value, and recording into a first frame.

The image encoding method further includes pixel-shifting the second image by a first shift amount in a direction based on a positional relationship between the main camera and the sub camera; and comparing the pixel value of the pixel at the first coordinates of the first image with a pixel value of a pixel at the first coordinates of the second image after the pixel shift to obtain a second difference value, determining whether the first coordinates are in the surface region or the back region on a basis of the second difference value, and recording into a second frame different from the first frame.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram for illustrating data formats of frames in the image encoding method according to a present embodiment;

FIG. 6 is a diagram for illustrating processing of the encoding system depicted in FIG. 5;

FIG. 32 is a diagram (3) for illustrating the still another example of the processing procedure by the image decoding method according to the present embodiment.

DESCRIPTION OF EMBODIMENTS

Hereinafter, embodiments of an image encoding method and an image encoding apparatus will be described in detail by referring to the accompanying drawings. The image encoding method and the image encoding apparatus according to a present embodiment assume minute viewpoint movement in which there are less calculation and less data.

The image encoding method and the image encoding apparatus according to the present embodiment encode three-dimensional image information into a plurality of two-dimensional images by simple processing, "shift+pixel value comparison", on the basis of a camera set (a camera group) including one main camera and at least one sub camera. Additionally, the image encoding method and the image encoding apparatus according to the present embodiment combine a plurality of the camera groups to extend a viewpoint movement range in an optional direction within the same plane.

In addition, an image decoding method and an image decoding apparatus according to a present embodiment shift a plurality of two-dimensional images as encoded data according to the position of a viewer to perform overwrite drawing, thereby generating an image from the viewpoint of the viewer.

The encoded image includes a region where overwrite drawing will not be performed (a transparent region: T region), and overwriting is performed by an appropriate drawing order and an appropriate shift amount to allow only objects that may be seen from a viewpoint position of the viewer to be left on a screen. In addition, the image decoding method and the image decoding apparatus according to the present embodiment may generate a parallax of an optional viewpoint without performing any specific calculation such as geometry calculation.

First will be described embodiments of the image encoding method and the image encoding apparatus will be described in detail, followed by a detailed description of embodiments of the image decoding method and the image decoding apparatus.

[Encoding]

Figure 1:
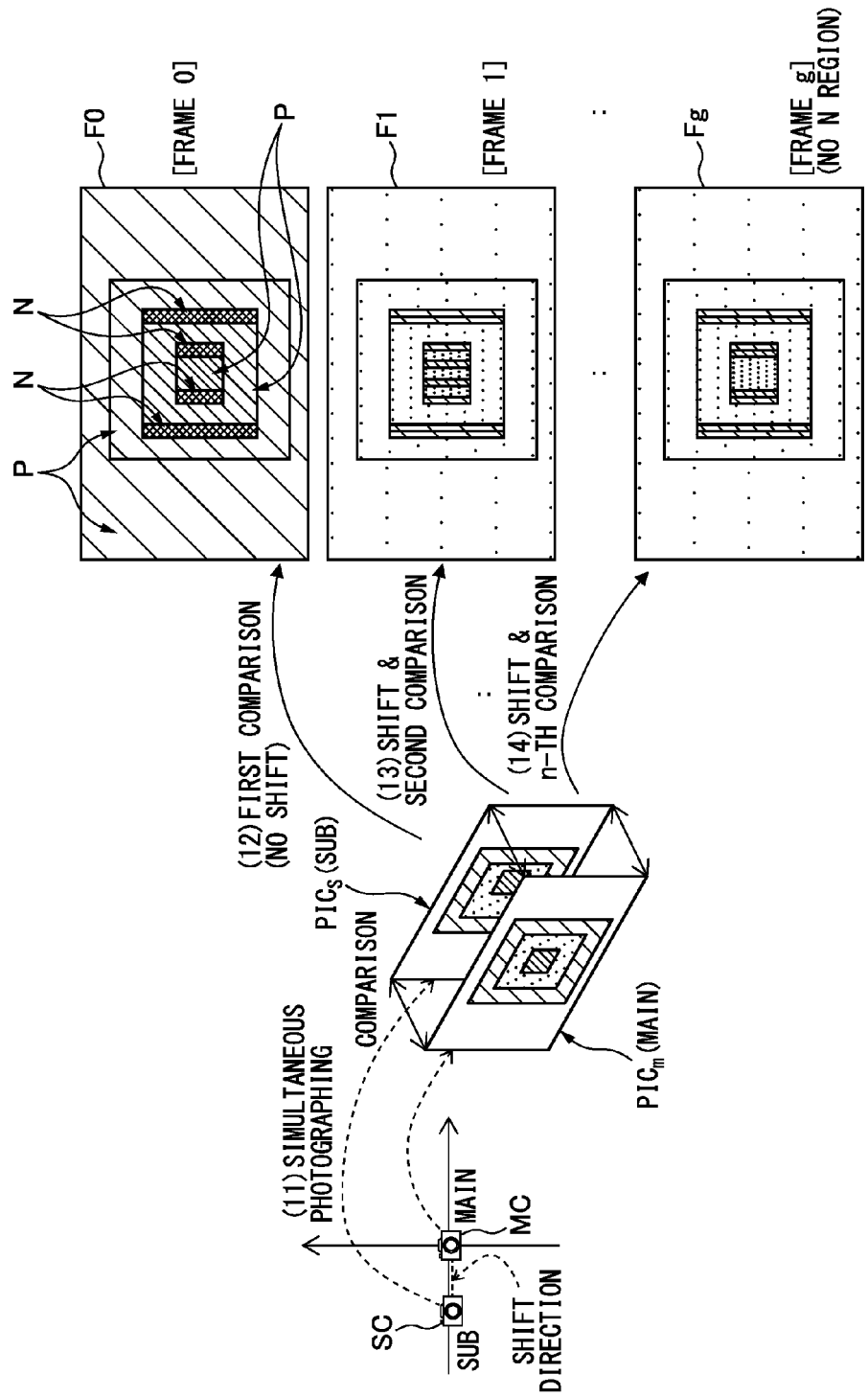
FIG. 1 is a diagram for illustrating a first embodiment of an image encoding method.

FIG. 1 is a diagram for illustrating a first embodiment of the image encoding method. In FIG. 1, reference sign MC denotes a main camera, SC denotes a sub camera, $PIC_m$ denotes an image captured by the main camera MC (a main camera image), $PIC_s$ denotes an image captured by the sub camera SC (a sub camera image), and F0 to Fg denote frames.

As depicted in FIG. 1, the image coding method of the first embodiment is applied to an encoding system including two photographing units (the main camera MC and the sub camera SC) located so that optical axes thereof become horizontal and capable of photographing under the same photographing conditions and at the same timing (the same setting and the same timing).

The main camera MC and the sub camera SC are located in different positions in a predetermined direction (a shift direction). A distance between the main camera MC and the sub camera SC is set to an appropriate length on the basis of various conditions, and, for example, may be set to about several mm to a few cm.

Then, both of the photographing units that are the main camera MC and the sub camera SC perform the following series of processing (11) to (14). Specifically, first, as depicted in (11) of FIG. 1, in simultaneously captured two images (a main camera image $PIC_m$ and a sub camera image $PIC_s$), a comparison is made between pixel values of pixels at the same coordinates.

Next, as depicted in (12) of FIG. 1, when the pixel values have a closeness of a predetermined threshold value or less in the comparison between the two pictures (images) PICm and PICs where shift is not performed, objects of the pixels are regarded as the same object (a subject) to be recorded in the same coordinates of a two-dimensional image (frame 0: F0) having the same resolution as the captured images.

In other words, with the processing (12), a region where the pixel values of pixels at the same coordinates have a closeness of a predetermined threshold value or less, i.e., a region where a difference between the pixel values of the pixels at the same coordinates is not more than a predetermined threshold value is recorded as a surface region (a P region) (information indicating a region type P is recorded).

In addition, with the processing (12), a region of the frame F0 not filled with pixel values is recorded as a back region (an N region) (information indicating a region type N is recorded). The P region and N region in the frame F0 will be described in detail later by referring to FIG. 4(a).

Then, after the first comparison processing (12) on all pixels is finished, subsequently, the sub camera image $PIC_s$ is pixel-shifted by a direction and a shift amount based on a positional relationship between the main camera MC and the sub camera SC, followed by second comparison processing (13).

The processing (13) performs a comparison between the main camera image $PIC_m$ and the pixel-shifted sub camera image $PIC_s$ again for coordinates of pixels that have been N regions in the frame F0 (based on the main camera image $PIC_m$).

Regarding the pixel shift, when the sub camera SC is positioned on the left (right) side of the main camera MC in a state where the main camera MC and the sub camera SC are arranged facing a side where the subject is located, pixels are shifted to the left (right) side. Then, as depicted in (13) of FIG. 1, the comparison result is recorded at the same coordinates of the main camera MC in another two-dimensional image (frame 1: F1) having the same resolution as the images.

Additionally, for example, in the frame F1, coordinates that have been the P region at the time of the previous frame (frame F0) are recorded as a transparent region (a T region) without pixel data (information indicating a region type T is recorded).

Hereinafter, the same processing as the above-described processing (13) is repeated to perform, for example, shift and comparison for a predetermined number of pixels, followed by final processing (shift and an n-th comparison processing) (14) in which N regions are eliminated or shift for the predetermined number of pixels is completed.

The number of the frames F0 to Fg, i.e., the number of pixels to be shifted per comparison or the number of pixels up until the completion of shift is determined on the basis of various factors, such as a length allowing minute viewpoint movement and a memory capacity for storing the frames F0 to Fg.

In this manner, according to the image encoding method of the first embodiment, by performing only shift and pixel value comparison on the main camera image $PIC_m$ and the sub camera image $PIC_s$, a viewpoint position image without viewpoint movement in a minute viewpoint movement-adapted image may be easily encoded.

Figure 2:
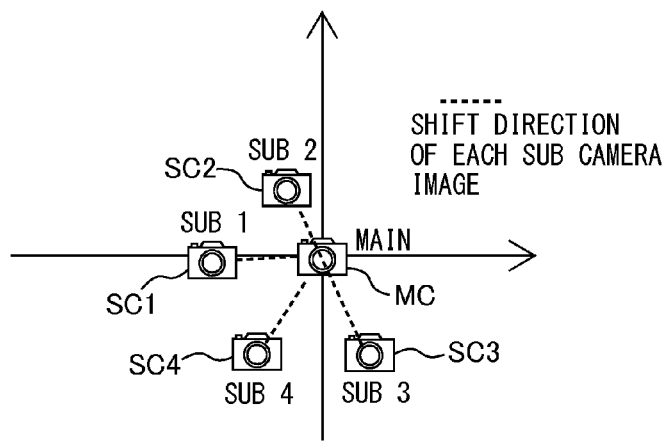
FIG. 2 is a diagram for illustrating a second embodiment of the image encoding method.

FIG. 2 is a diagram for illustrating a second embodiment of the image encoding method. In FIG. 2, reference sign MC denotes a main camera, SC1 denotes a first sub camera (sub 1), SC2 denotes a second sub camera (sub 2), SC3 denotes a third sub camera (sub 3), and SC4 denotes a fourth sub camera (sub 4).

As depicted in FIG. 2, the image encoding method of the second embodiment uses the plurality of (four) sub cameras SC1 to SC4, as an alternative to the single sub camera SC in the first embodiment. In FIG. 2 (in other drawings as well), broken lines " - - - " indicate shift directions of images captured by the respective sub cameras SC1 to SC4 (shift directions of the respective sub camera images).

In other words, the image encoding method of the second embodiment is applied to an encoding system in which at least one (the three sub cameras SC2 to SC4) is further added to the encoding system including the main camera MC and the sub camera SC (corresponding to the sub camera SC1) to which the first embodiment is applied.

Each of the sub cameras SC1 to SC4 is positioned on a plane passing through the main and sub cameras and perpendicular to optical axes of the main and sub cameras, and in a position where the optical axes are located in a position horizontal to the main and sub cameras. The number of the sub cameras is not limited to four and there may be arranged an optional number n of the sub cameras.

Then, the main camera MC and the plurality of sub cameras SC1 to SC4 perform the following series of processing (21) to (24). Two or more of the sub cameras are assumed not to be located on the same straight line as long as the main camera is not located between the sub cameras. Although the sub cameras SC2 and SC3 are located on the same straight line, they are in positions having the main camera MC therebetween.

Thereby, a minute viewpoint movement may be made in each direction between the main camera MC and each of the sub cameras SC1 to SC4. In other words, a viewer may move his or her viewpoint in each direction to acquire a three-dimensional image.

<Processing Procedure>

First, images are captured by the main camera MC and each of the sub cameras SC1 to SC4 in the same setting and at the same timing. Then, the main camera image and each of the sub camera images are subjected to the processing for each of the main camera image $PIC_m$ and the sub camera image $PIC_s$ described in the first embodiment.

Specifically, in the main camera image and each of the sub camera images, a comparison is made between respective pixel values of the same coordinates. When the differences between the pixel values in all the images are not more than a predetermined threshold value, objects of the pixels are regarded as the same object and the region thereof is recorded as P region at the same coordinates of a two-dimensional image (frame F0) having the same resolution as the images. In addition, regions of the frame F0 not filled with pixel values are recorded as N regions.

Then, after the comparison regarding all pixels is finished, subsequently, each sub camera image is pixel-shifted by a direction and a shift amount according to the positions where the photographing units of the respective cameras are located. Then, again, a comparison with the main camera image is made regarding coordinates of pixels that have been N region in the frame F0 (based on the main camera image).

Each sub camera image is shifted in a direction moving away from the main camera on a straight line that connects itself and the main camera in a state where the cameras face the side where the subject is located. In addition, the number of pixels to be shifted is set to be proportional to a distance between the main camera and the each sub camera. Furthermore, data to be stored is one piece of non-parallax region image data plus (+) a plurality of pieces of parallax region image data.

In minute viewpoint movement, a parallax portion is a very small region in the entire image. Thus, substantially, the amount of data of about one piece of image data+α allows storage of a high precision intermediate viewpoint image between the main camera MC and each of the sub cameras SC1 to SC4.

Figure 3:
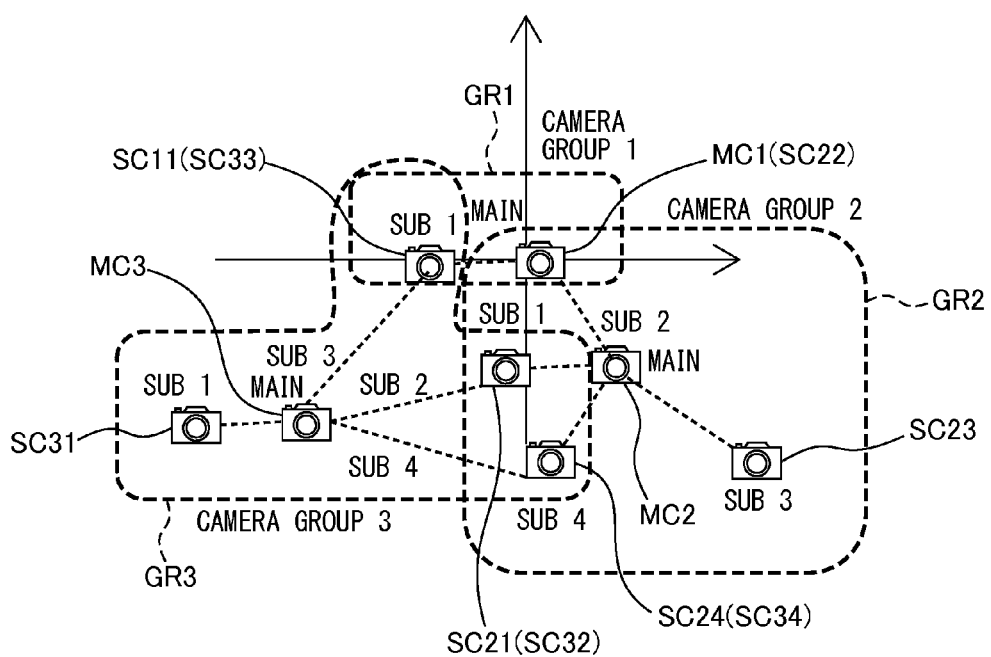
FIG. 3 is a diagram for illustrating a third embodiment of the image encoding method.

FIG. 3 is a diagram for illustrating a third embodiment of the image encoding method. In FIG. 3, reference signs GR1 to GR3 denote camera groups located on the same plane. The camera group GR1 includes a main camera MC1 and a sub camera SC11, and the camera group GR2 includes a main camera MC2 and sub cameras SC21 to SC24. Additionally, the camera group GR3 includes a main camera MC3 and sub cameras SC31 to SC34.

The main camera MC1 of the camera group GR1 is also used as the sub camera SC 22 of the camera group GR2. In addition, the sub camera SC11 of the camera group GR1 is also used as the sub camera SC33 of the camera group GR3.

Furthermore, the sub camera SC21 of the camera group GR2 is also used as the sub camera SC32 of the camera group GR3, and in addition, the sub camera SC24 of the camera group GR2 is used as the sub camera SC34 of the camera group GR3.

In other words, in the image encoding method of the third embodiment, the systems (the camera groups) of the above-described first and second embodiments are provided in plural numbers, in which the adjacent systems are configured to share one or more cameras.

It is optional whether each of the cameras shared by the plurality of systems serves as the main camera or any sub camera in each camera group. A single camera may belong to an optional system as long as the condition that "as long as two sub cameras in the same system do not have the main camera therebetween, two or more sub cameras are not located on the same straight line" is satisfied, and the number of cameras shared between the adjacent two systems may also be optional.

In this manner, in each direction between each of the main cameras MC1, MC2, and MC3 and each of the sub cameras SC11, SC21 to SC24, and SC31 to SC34, the viewer may move his or her viewpoint to acquire a three-dimensional image.

In other words, in the third embodiment, since the number of frames to be subjected to encoding processing increases according to the main cameras MC1 to MC3, the memory capacity and the calculation amount end up increasing slightly, but the degree of freedom in the viewpoint movement of the viewer may be improved.

Then, according to the image encoding methods of the first to the third embodiments, three-dimensional image information to be used for minute viewpoint movement may be encoded by the simple processing: "shift+pixel value comparison". Accordingly, for example, the amount of calculation may be significantly reduced as compared to the conventional techniques using geometry calculation. Furthermore, since viewpoint data to be encoded becomes "one viewpoint+ parallax data", the amount of data to be encoded may also be reduced.

In the first to three embodiments described above, for example, by recording the N regions (back regions) of the frame F0 and sub camera pixel values at coordinates thereof, it is possible to relieve a problem with the shortage of drawing data of a background portion in viewpoint movement by the viewer at the time of decoding (a fourth embodiment).

Specifically, the image encoding method of the fourth embodiment generates parallax interpolation frames (Fi0 and Fi1) to use the parallax interpolation frames as drawing data for reducing a sense of incompatibility in viewpoint movement by the viewer when decoding. When there is no viewpoint movement, all pixels of the N regions of the frame F0 are supposed to be overwritten. Thus, drawing of the N regions does not need to be performed.

In the above embodiments, an applicable recording format may be optional. An image having the same size as an encoding frame may be prepared for each sub frame (sub camera image) to record therein, or alternatively, an exclusive format may be prepared so that encoding efficiency and processing efficiency may be improved. In other words, for data recording, various known formats, and compression techniques may be applied.

Each of the image encoding methods of the first to the fourth embodiments described above may be achieved, for example, as an image encoding program to be executed by a central processing unit (CPU).

FIG. 4 is a diagram for illustrating data formats of frames in the image encoding method according to the present embodiment. FIG. 4(a) corresponds to the frame F0 in FIG. 1 described above, and FIG. 4(b) corresponds to the frame F1 in FIG. 1 described above. In FIG. 4(b), for easier understanding, pixel data is drawn in T regions. However, the T regions in the encoding data do not include pixel data.

As depicted in FIG. 4(a) and FIG. 4(b), an image stored in each frame is divided into three kinds of regions: P region (surface region: hatched portion), N region (back region: cross-hatched portion), and T region (transparent region: dotted portion).

The P region is a region where there are objects (subjects), and the only region for recording an image captured by a camera as it is. In other words, the P region is the only region for recording pixel data. In addition, the N region is a region where there are objects but, for example, a hidden region that cannot be seen due to an object in front.

Furthermore, the N region is a region in which a picture is completed by interpolating a part of the region by any means so that, at the time of decoding, when there is no viewpoint movement, the region is overwritten and not left, whereas when there is a viewpoint movement, the region is left. In the present embodiment, a part of portions that become an N region in the data of only the main camera is interpolated by pixel data of sub camera.

Then, the T region is a transparent region where no object exits in the space thereof and that holds only region data but not pixel values. Coordinates that have been in P region once in a previously processed frame when encoding are set in a T region in frames thereafter. Additionally, pixels that are in a T region when decoding will not be overwritten.

Figure 5:
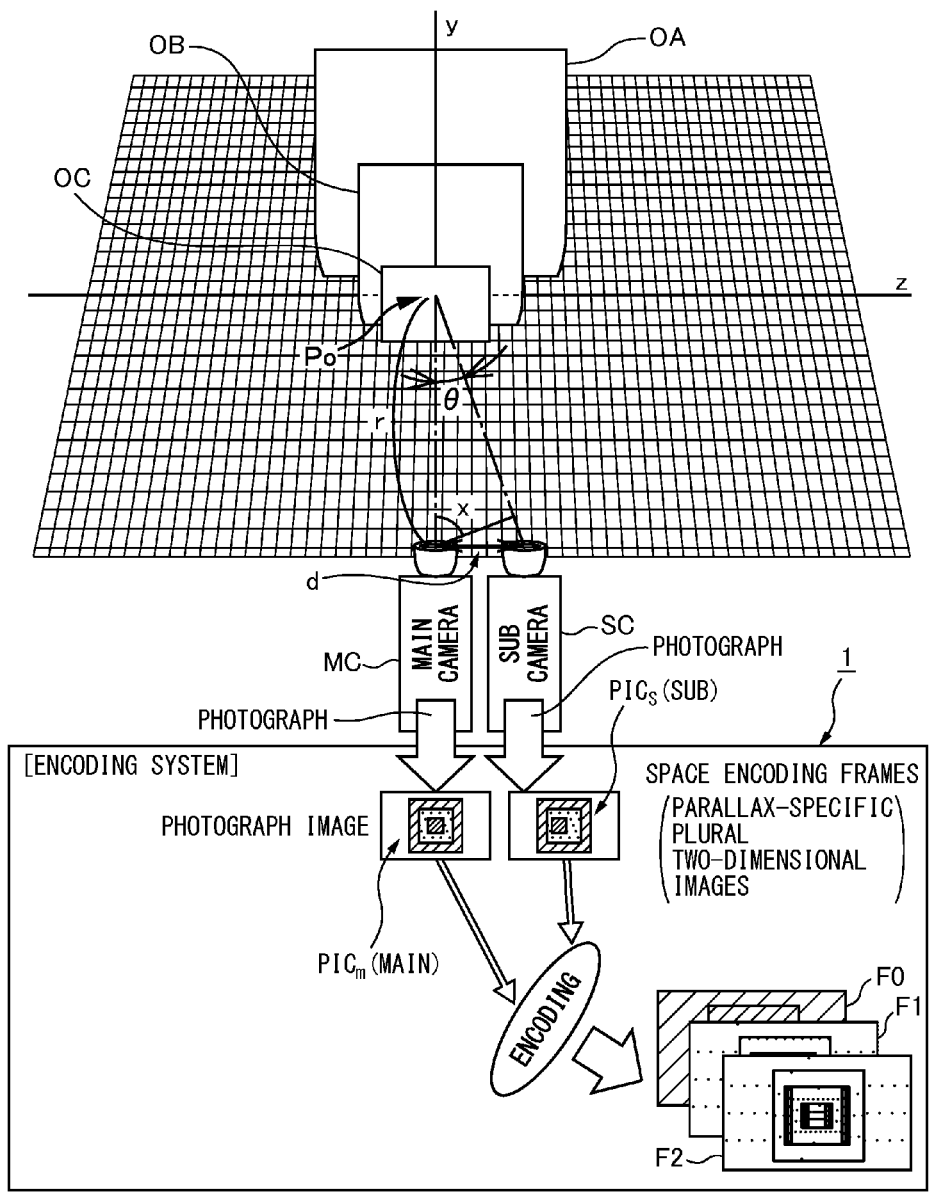
FIG. 5 is a diagram depicting the entire structure of an encoding system to which the image encoding method of the first embodiment is applied.

FIG. 5 is a diagram depicting the entire structure of the encoding system to which the image encoding method of the first embodiment is applied. The diagram depicts one example of the system to which the image encoding method of the first embodiment using the two cameras, the main camera MC and the sub camera SC described by referring to FIG. 1 is applied. In FIG. 5, reference sign 1 denotes an encoding system (an image encoding apparatus), and reference signs OA to OC, respectively, denote subjects (objects to be captured).

In this drawing, a minute viewpoint movement range to be assumed is given as follows: when, at an observation target point $P_o$, an angle made by the main camera MC and the sub camera SC is θ and a length (radius) from the observation target point $P_o$ up to the main camera MC is r, a distance d between the main camera MC and the sub camera SC may be substantially approximated to rθ (d=rθ).

In other words, the viewpoint movement range is limited to, for example, an typical range for TV-viewing (a minute viewpoint movement range: a range where the viewer just moves his or her head (performs a parallel movement). This means that, for example, at a viewpoint between the main camera and the sub camera SC, an object located at a distance satisfying the relationship of d=rθ with respect to the subject moves in parallel in proportion to a distance at where the viewpoint is moved from the main camera MC on a screen.

In FIG. 1, the sub camera SC is located on the left of the main camera MC, which can, however, obviously be regarded as being the same as the case where the sub camera SC is located on the right of the main camera MC, as in FIG. 5.

An encoding system 1 receives a main camera image $PIC_m$ and a sub camera image $PIC_s$ simultaneously captured by the main camera MC and the sub camera SC whose optical axes are located horizontally to generate space encoding frames (a plurality of parallax-specific two-dimensional images).

Specifically, the encoding system 1 to which the simultaneously captured main camera image $PIC_m$ and sub camera image $PIC_s$ are input performs shift and pixel value comparison in the images to encode three-dimensional image information that is used for generating a minute viewpoint movement-adapted image into a plurality of frames F0 to F2.

FIG. 6 is a diagram for illustrating processing of the encoding system depicted in FIG. 5. FIG. 6(a) depicts locations of the main camera MC, the sub camera SC, an object (a subject) OM, and a background BK, and FIG. 6(b) illustrates an example of the processing by the encoding system 1.

As depicted in FIG. 6(a), the main camera MC and the sub camera SC are spaced apart from each other by the distance d in the horizontal direction, and simultaneously photograph the object OM to acquire a main camera image $PIC_m$ and a sub camera image $PIC_s$. For example, in the main camera image $PIC_m$ and the sub camera image $PIC_s$, the objects OM are assumed to have been captured (drawn) by being shifted by s pixels.

In addition, in the present embodiment, although objects in front are located in the same depth, shapes of the objects change depending on the viewpoint position and thus a large parallax occurs, whereas objects located at a depth not less than a certain length are not deformed and center parts of the objects almost match each other, thus assuming that parallax occurs only at a boundary between different depths. In other words, the present embodiment is directed for an image including "such a depth that parallax hardly occurs on the same depth and parallax occurs only at a boundary portion between different depths".

Furthermore, since the present embodiment assumes dealing with only a minute movement (viewpoint movement) in which the shape of the object OM does not change, the subject (the object OM) in the sub camera image $PIC_s$ is drawn in such a manner that it is horizontally shifted by a certain amount (s pixels) to the right with respect to the subject in the main camera image $PIC_m$. The shift amount (s) of the image changes according to the distance d between the main camera MC and the sub camera SC and a distance to the object OM.

The image encoding method of the first embodiment repeats a technique in which pixel value comparison is made, for example, while gradually shifting the sub camera image PICds to the right side, and only newly matched coordinates are stored in a frame.

First, a description will be given of an example in which the sub camera image $PIC_s$ is shifted on a s/2 pixel basis. Specifically, as depicted in <I> of FIG. 6(b), in the frame F0, the sub camera image $PIC_s$ is not shifted with respect to the main camera image $PIC_m$, and a comparison is directly made between pixel values of pixels at the same coordinates.

When a difference between the pixel values of the pixels at the same coordinates is not more than a predetermined threshold, the objects of the pixels are regarded as being the same object and the coordinates are recorded as P region into the frame F0, whereas regions not filled with pixel values are recorded as N region into the frame F0.

Furthermore, the sub camera image $PIC_s$ is shifted in a right direction by s/2 pixels to compare pixel values again and record P region and N region into the frame F1. In the frame F1, T region is also recorded at coordinates that have been in a P region at the time of the previous frame F0.

In addition, when (in case of) the sub camera image $PIC_s$ is shifted in the right direction by s/2pixels, the image is shifted by s pixels as a whole. Then, a pixel value comparison is made again, and P region, N region, and T region are recorded in the frame F2.

In this manner, by shifting by s/2 pixels, the same pixel values when seen from both of the main camera MC and the sub cameras SC are recorded in the frame F0, and a parallax portion is divided into two parts to be recorded in the frames F1 and F2.

Next will be described another example in which the sub camera image $PIC_s$ is shifted on a single pixel basis. As depicted in <II> of FIG. 6(b), in shifting the image on the single pixel basis, shift processing is performed s times in order to shift the image by an amount corresponding to s pixels. Accordingly, s+1 pieces of frames F0 to Fs are generated, which requires a memory having a capacity enough to store the frames.

In other words, reducing the number of pixels per shift allows fine division, so that reproducibility of a viewpoint image at the time of decoding may be improved. On the other hand, since the number of the frames increases, the amount of encoding data relatively increases, and the amount of calculation in encoding and decoding increases. Thus, there is a trade-off relationship therebetween. Accordingly, the number of pixels to be shifted in one-time processing is set to an appropriate value on the basis of an apparatus to be applied and design specifications.

The plurality of frames F0 to F2 and F0 to Fs thus obtained are stacked on top of each other to form a image of the main camera MC, and the frames F1, F2, and F1 to Fs are shifted and stacked together to allow generation of an image subjected to viewpoint movement. Details will be given in the section of [Decoding].

Figure 7:
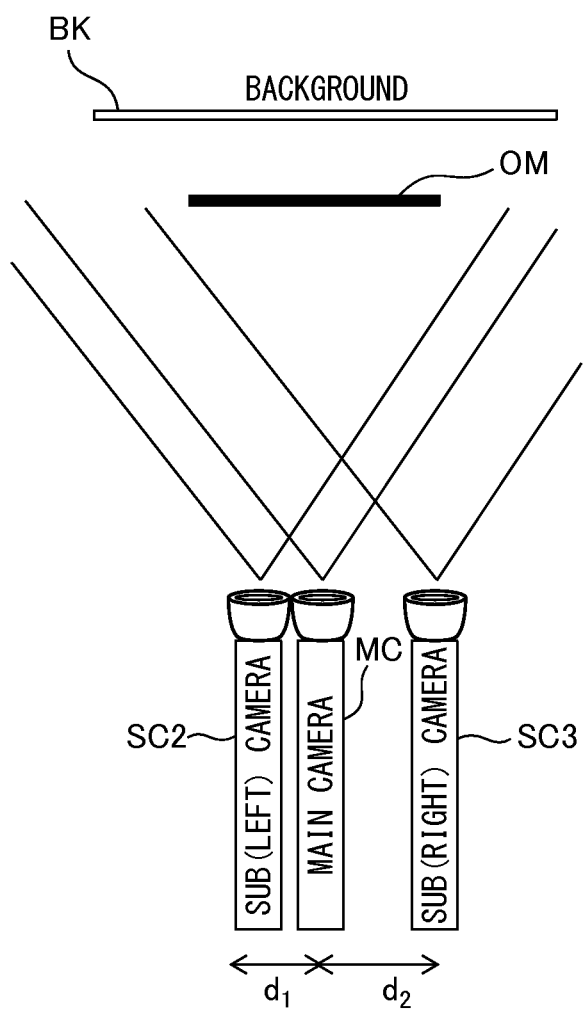
FIG. 7 is a diagram (1) for illustrating processing of an encoding system to which the image encoding method of the second embodiment is applied.
Figure 8:
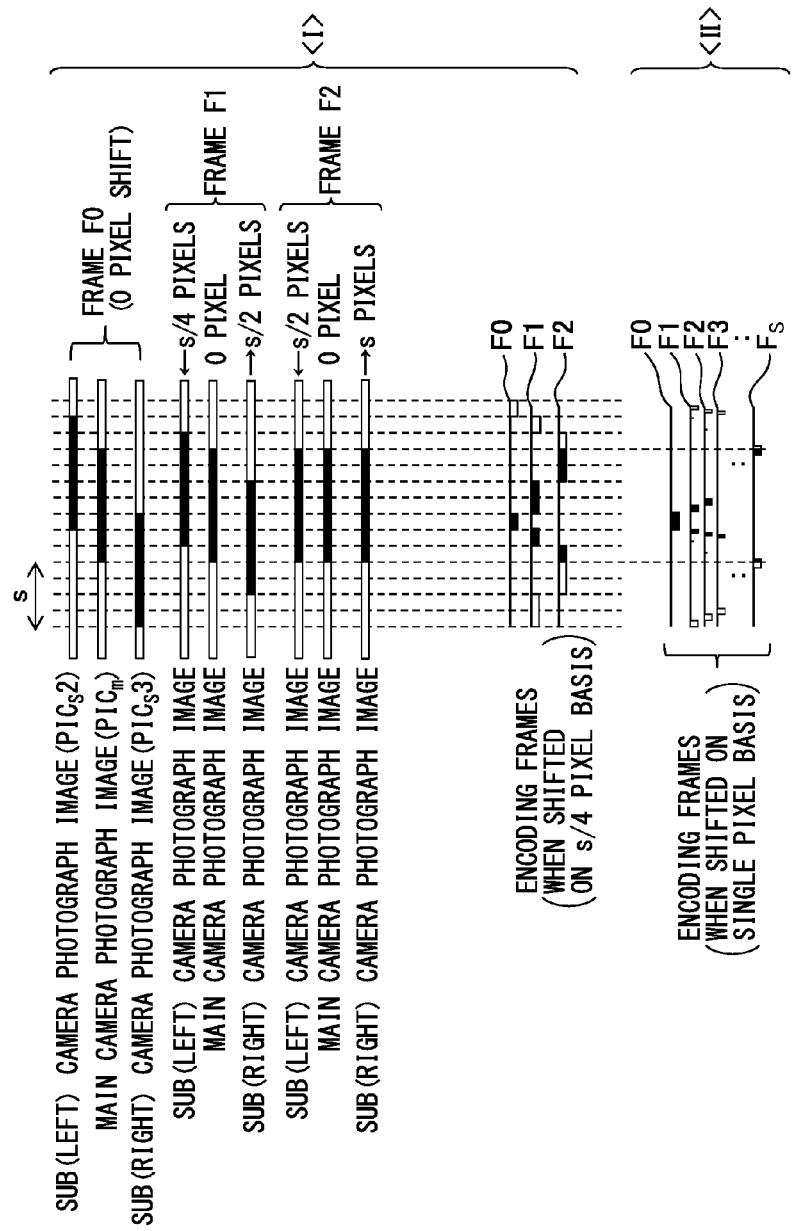
FIG. 8 is a diagram (2) for illustrating the processing of the encoding system to which the image encoding method of the second embodiment is applied.

FIG. 7 and FIG. 8 are diagrams for illustrating processing of an encoding system to which an image encoding method of a second embodiment is applied. FIG. 7 corresponds to FIG. 6(a) described above, and FIG. 8 corresponds to FIG. 6(b) described above.

As depicted in FIG. 7, regarding three cameras (a main camera MC, sub cameras SC2 and SC3), there will be considered a case in which each of the sub cameras SC2 and SC3 is located on each side of the main camera MC so that the sub cameras have the main camera therebetween, and the three cameras are aligned on a straight line (sub (left) SC2/main MC/sub (right) SC3). When a distance between the main camera MC and the sub (left) camera SC2 is represented by $d_1$ and a distance between the main camera MC and the sub (right) camera SC3 is represented by $d_2$, a relationship: $2 \times d_1 = d_2$ is assumed to hold true.

As depicted in FIG. 8, when, due to the horizontal movement of an object OM, the object is drawn in a rightward position by s/2 pixels in a image $PIC_s2$ captured by the sub (left) camera SC2, the object OM is drawn in a leftward position by s pixels in a image $PIC_s3$ of the sub (right) camera SC3. Pixel value comparison is made while shifting the sub (left) camera image and the sub (right) camera image so that the above shift is restored.

For example, as depicted in <I> of FIG. 8, the sub (left) camera image is shifted in the left direction by s/4 pixels and the sub (right) camera image is shifted in the right direction by s/2 pixels to make a pixel value comparison and record P region, N region, and T region into the frame F1.

In addition, the sub (left) camera image is shifted in the left direction by s/4 pixels and the sub (right) camera image is shifted in the right direction by s/2 pixels to make a pixel value comparison and record P region, N region, and T region into the frame F2.

In this manner, in the image encoding method of the second embodiment as well, frames may be encoded by dividing parallax, as with the first embodiment (the two cameras: main camera and sub camera) described above. In the comparison between pixel values, only pixels whose pixel values match together in all the images are regarded as P region.

In addition, the number of pixels to be shifted is not limited to s/4 and s/2 pixel bases. For example, in the case of a single pixel basis, as depicted in <II> of FIG. 8, since shift processing is performed s times, s+1 pieces of frames F0 to Fs will be generated. Thus, the number of pixels to be shifted in one-time processing is set to an appropriate value on the basis of an apparatus to be applied and design specifications.

Thus, according to the image encoding method of the present embodiment, by comparison between pixel values of respective images of the main camera and the sub cameras, difference pixel values are held in the corresponding frame on the basis of a length in which pixels having different values continue. In other words, parallax pixel values close in length are held in the same frame.

Figure 9:
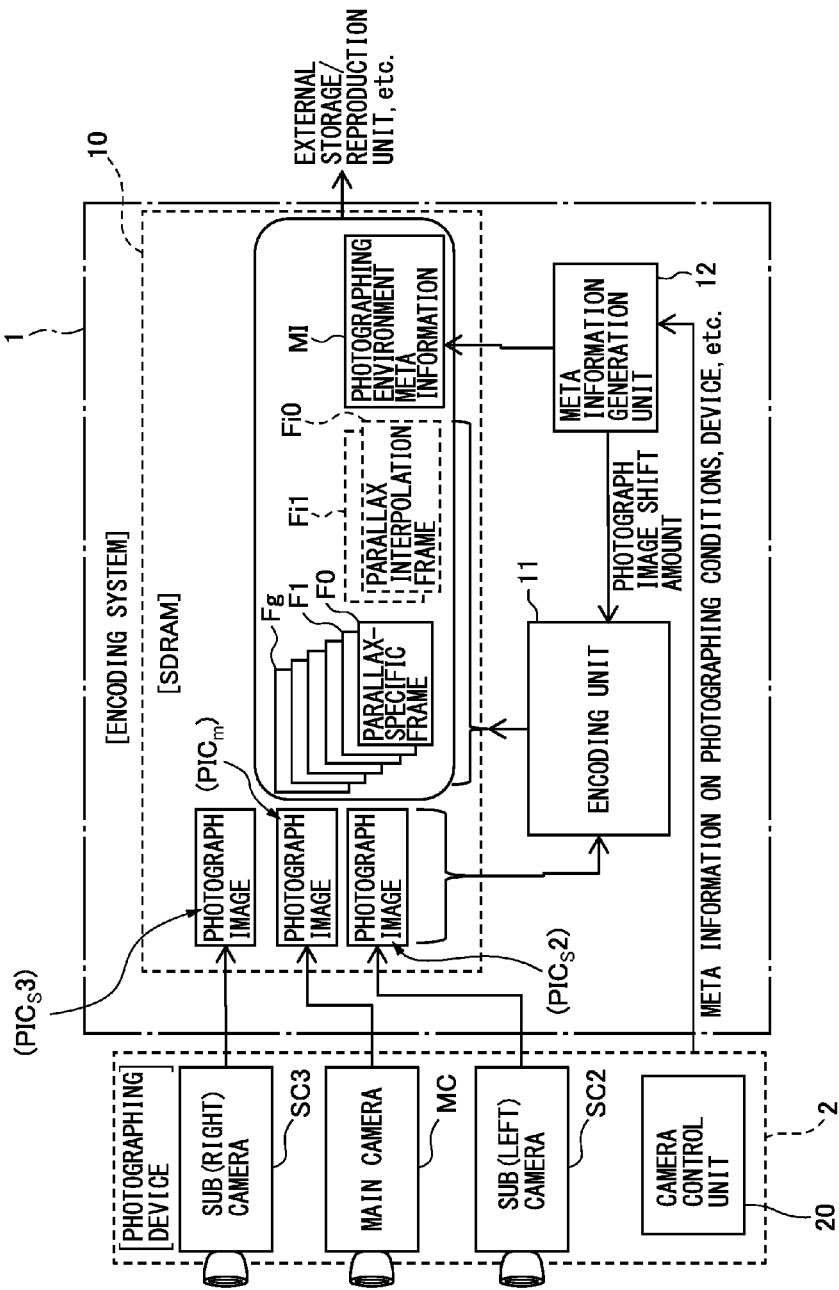
FIG. 9 is a block diagram depicting an example of the encoding system to which the image encoding method is applied.

FIG. 9 is a block diagram depicting an example of the encoding system to which the image encoding method is applied, and mainly depicts an encoding system to which the image encoding method of the second embodiment is applied. In FIG. 9, reference sign 1 denotes an encoding system (an image encoding apparatus), and 2 denotes a photographing device.

As depicted in FIG. 9, the encoding system 1 includes a memory (SDRAM: Synchronous Dynamic Random Access Memory) 10, an encoding unit 11, and a meta information generation unit 12. The photographing device 2 includes a main camera MC, sub cameras SC2, SC3, and a camera control unit 20.

The photographing device 2 is drawn to include three cameras (the main camera MC, and the sub (left) camera SC2, and the sub (right) camera SC3) in such a manner as to correspond to FIG. 7. However, the number of the cameras may be changed variously.

Specifically, in the case of the first embodiment, it is enough to use the two cameras: the main camera MC and the sub camera SC. In addition, in cases of providing the plurality of camera groups GR1 to GR3, as in the third embodiment, there will be provided a large number of cameras.

The camera control unit 20 controls calibration of positional information on all of the cameras, simultaneous photographing of a subject, and the like. The camera control unit 20 may be separately provided for each of the cameras MC, SC2, and SC3.

The SDRAM 10 stores (memorizes) a sub (right) camera image $PIC_s3$ from the sub (right) camera SC3, a main camera image $PIC_m$ from the main camera MC, and a sub (left) camera image $PIC_s2$ from the sub (left) camera SC2.

Additionally, the SDRAM 10 stores parallax-specific frames (F0 to Fg) obtained by the pixel value comparison and shift processing described above, photographing environment meta information MI generated by the meta information generation unit 12, and parallax interpolation frames Fi0 and Fi1.

The photographing environment meta information MI is assumed to include a positional relationship between the respective cameras in the photographing device 2, photographing conditions depending on mounting, and environment information at a time of photographing (such as places and directions of the cameras).

In addition, the meta information generation unit 12 generates output meta information on the basis of information on the photographing conditions, the photographing device, and the like received from the photographing device 2. Furthermore, based on the received information, the meta information generation unit 12 also performs processes such as calculation of a shift amount in encoding each image and transfer to the encoding unit 11. Additionally, the meta information may also include information other than the received information.

In the encoding system to which the fourth embodiment is applied, encoding is performed independently per photographing device connected thereto. Accordingly, the encoding system 1 may be provided in numbers corresponding to the number of sets of the photographing devices 2.

Alternatively, the encoding system 1 may be prepared in fewer numbers than the number of sets of the photographing devices 2 to perform encoding by time-division. However, since simultaneous photographing is performed by all the cameras, even when encoding by time-division, photograph data of all the cameras are required to be stored in the SDRAM 10 at a time of photographing.

Figure 10:
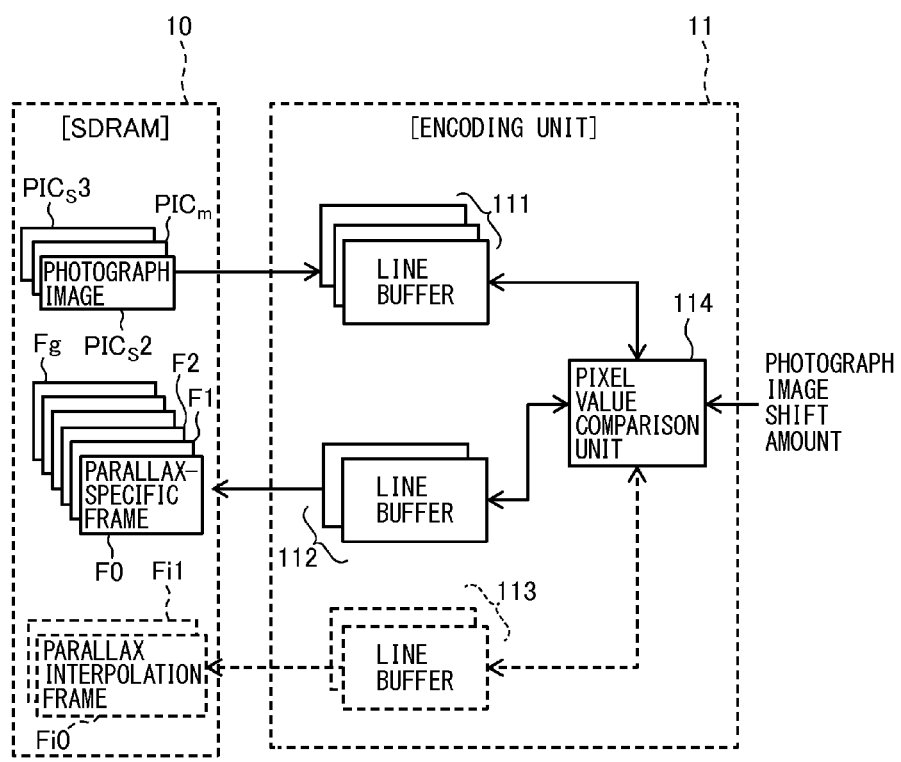
FIG. 10 is a block diagram depicting in more detail an encoding unit of the encoding system depicted in FIG. 9.

FIG. 10 is a block diagram depicting in more detail the encoding unit in the encoding system depicted in FIG. 9. As depicted in FIG. 10, the encoding unit 11 includes a line buffer 111 that reads out and holds the images ($PIC_m$, $PIC_s2$, and $PIC_s3$) stored in the SDRAM 10 and a line buffer 112 that holds data to be written into the parallax-specific frames F1 to Fg. Additionally, the encoding unit 11 includes a line buffer 113 that holds data to be written into the parallax interpolation frames Fi1 and Fi2 and a pixel value comparison unit 114 that performs comparison between pixel values.

In reading out a image, not all the frames are read out together. For example, data of only the same line as a reference pixel are simultaneously read out and held in the line buffer 111. Technically, data to be simultaneously read out may be only data of the reference pixel. However, in an actual system, since data is often read out on a line basis from the SDRAM 10, the line buffer 111 is provided. Obviously, besides reading-out on a line basis, data may be read out on a pixel basis, on a plural line basis, on a frame basis, or the like.

In addition, while the image buffer (line buffer) 111 is provided in numbers corresponding to the number of images, it may be enough for the parallax-specific frame buffer 112 to be provided for two frames: a frame in which encoding has been finished immediately before and a frame in which encoding is being currently performed. Furthermore, it may be enough for the parallax interpolation frame buffer 113 to be provided in numbers corresponding to the number of the sub cameras (two in the example of FIG. 9 and FIG. 10).

Figure 11:
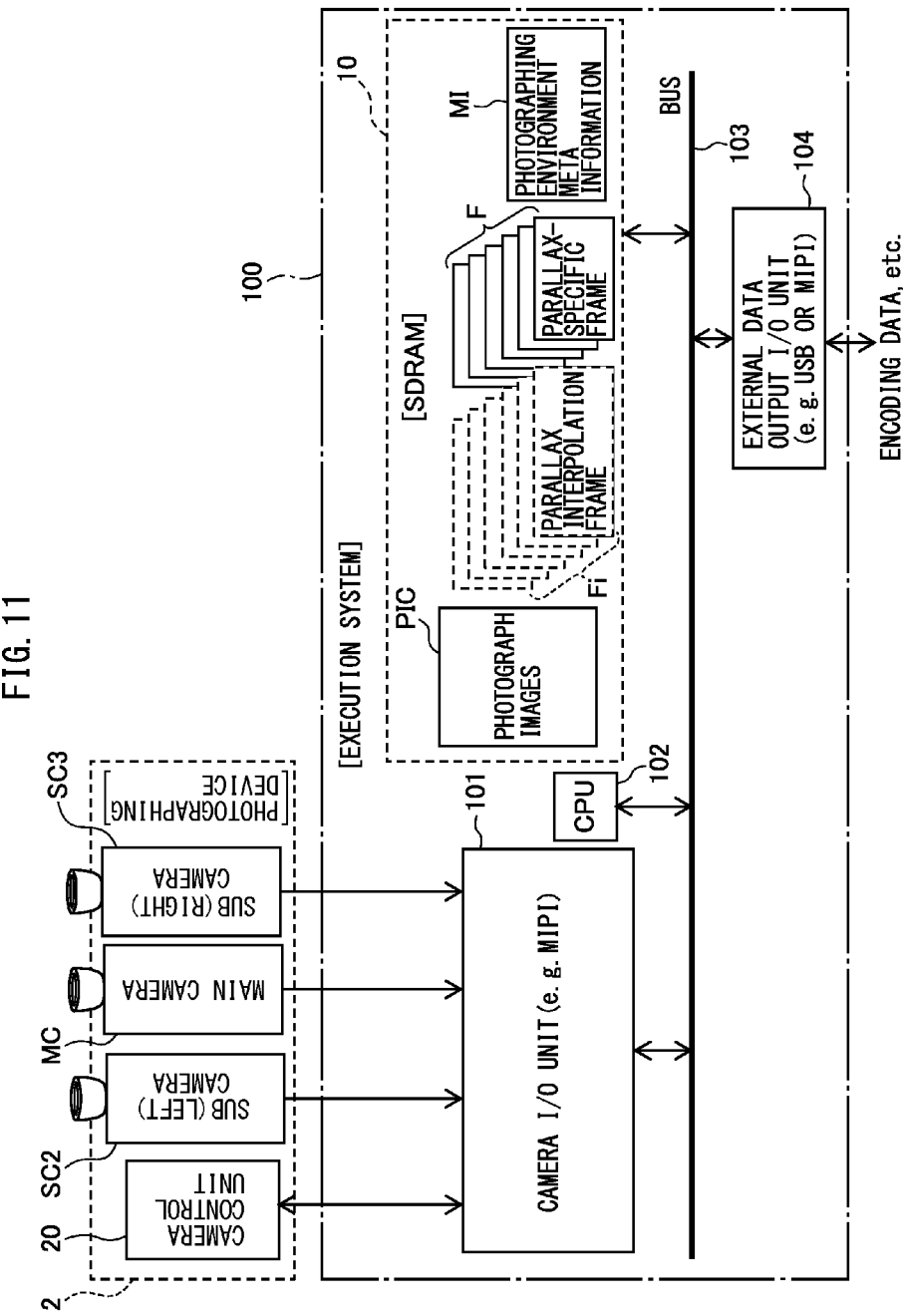
FIG. 11 is a block diagram depicting an example of an execution system to which an image encoding program of the second embodiment is applied.

FIG. 11 is a block diagram depicting an example of an execution system to which an image encoding program of the second embodiment is applied. As described above, the image encoding method of the present embodiment may also be achieved, for example, as an image encoding program to be executed by a central processing unit.

As depicted in FIG. 11, an execution system (image encoding apparatus) 100 includes an SDRAM 10, a camera I/O (Input/Output) unit 101, a CPU (central processing unit) 102, a bus 103, and an external data output I/O unit 104. The camera I/O unit 101 transmits and receives signals to and from the camera control unit 20 in the photographing device 2, and receives image data from each of the cameras MC, SC2, and SC3.

The camera I/O unit 101 may be, for example, an interface such as MIPI (Mobile Industry Processor Interface). In addition, in FIG. 11, although the camera I/O unit 101 is drawn as a single camera I/O unit 101, the I/O unit may be provided individually for each of the cameras and the camera control unit.

The SDRAM 10, for example, receives images captured by the cameras MC, SC2, and SC3 in the photographing device 2 via the camera I/O unit 101 and the bus 103 and stores the images PIC ($PIC_m$, $PIC_s2$, and $PIC_s3$).

In addition, the SDRAM 10 stores the parallax-specific frames F (F0 to Fg), the photographing environment meta information MI, and the parallax interpolation frames Fi (Fi0, Fi1, . . . ), and the like, as described by referring to FIG. 9 and FIG. 10.

The CPU 102 performs various kinds of processing, such as, for example, control of photographing by the cameras MC, SC2, and SC3 via the camera control unit 20 and generation of the parallax-specific frames F by performing shift and comparison processing on the images PIC stored in the SDRAM 100.

The external data output I/O unit 104, for example, outputs encoded data subjected to encoding processing by the CPU 102 to outside. In addition, the program to be executed by the CPU 102 may be stored, for example, in an external memory (not shown) and executed by the CPU 102 via the external data output I/O unit 104.

Obviously, the program to be executed by the CPU 102 may also be stored, for example, in a non-volatile memory such as a flash memory incorporated in the execution system 100. embodiments of the external data output I/O unit 104 applicable include USB (Universal Serial Bus) and MIPI.

Figure 12:
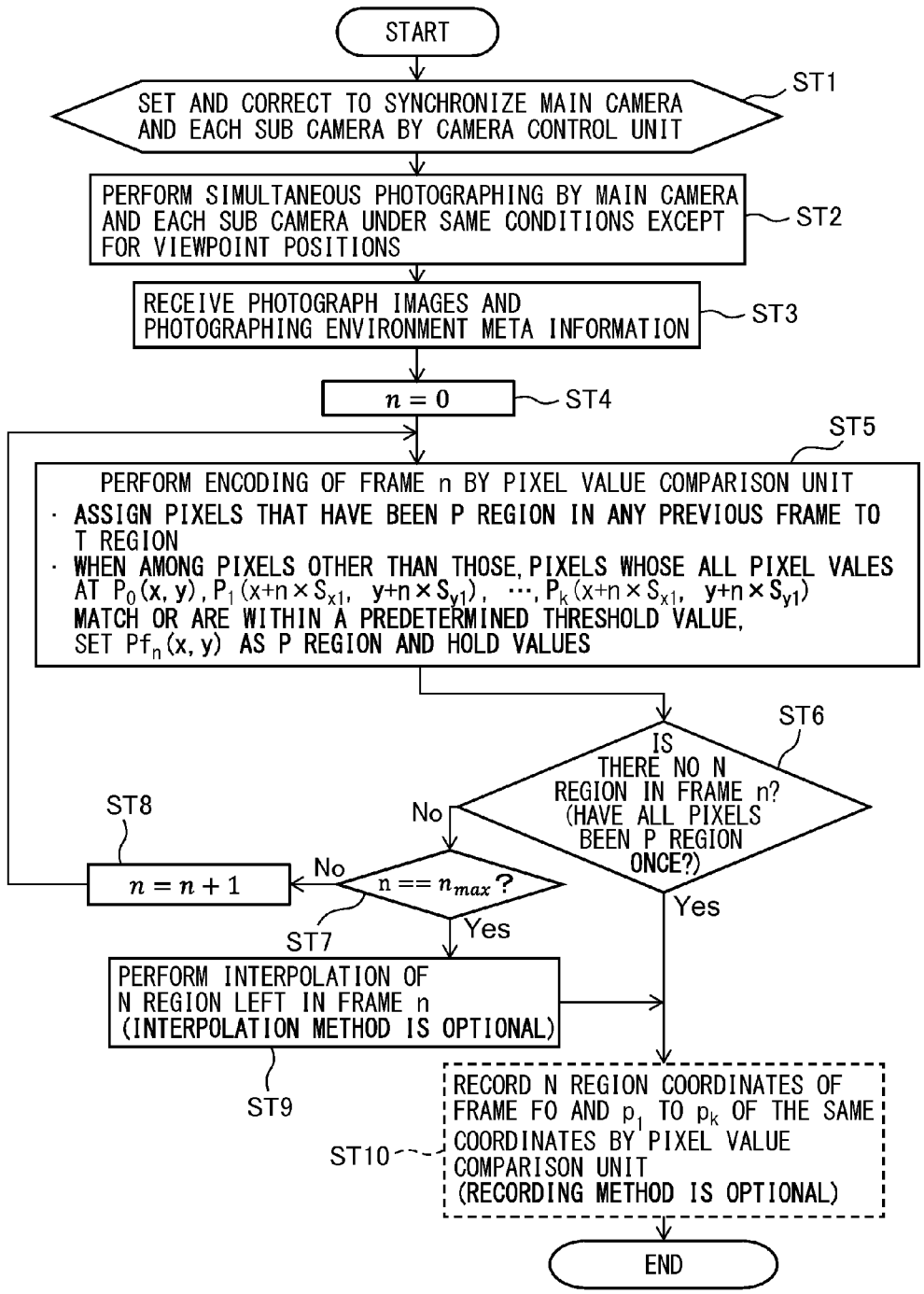
FIG. 12 is a flowchart for illustrating an example of the processing in the image encoding method of the second embodiment.

FIG. 12 is a flowchart for illustrating an example of an image encoding processing to which the image encoding method of the second embodiment. The image encoding processing to which the image encoding method of the first embodiment is applied will correspond to a case of k=2 in the following description.

In the description below, reference sign x denotes a horizontal index, y denotes a line index, k denotes the total number of sub cameras, and n denotes a frame number. In addition, $s_{xi}$ denotes a horizontal movement basis when shift is performed in the image of each sub camera (in which the basis is the number of pixels: i=1, 2, 3, . . . k) and $s_{yi}$ denotes a vertical movement basis when shift is performed in the image of each sub camera (in which the basis is the number of pixels: i=1, 2, 3, . . . k). It is assumed that the $s_{xi}$ and $s_{yi}$ are determined depending on camera positions, photographing conditions, setting for encoding, and the like and are not changed during photographing.

Furthermore, $p_i$ (horizontal coordinate, vertical coordinate) denotes the coordinates of each camera. In addition, i denotes a camera number, i=0 denotes the main camera, and i=1, 2, 3, . . . , k denotes each sub camera. Then, $p_{tn}$ (horizontal coordinate, vertical coordinate) denotes coordinates of a frame n, and $n_{max}$ denotes a maximum shift amount (a maximum value of n).

As depicted in FIG. 12, when the image encoding processing starts, at a step ST1, the camera control unit 20 performs setting and correction so as to synchronize the main camera MC and each of the sub cameras (SC1 to SCk (SC4)), and processing goes on to a step ST2.

At the step ST2, the main camera MC and each sub camera SC perform simultaneous photographing in such a manner that photographing conditions except for viewpoint positions are the same. In other words, all the cameras photograph a subject under the same photographing conditions and at the same timing (the same setting/the same timing), and, going on to a step ST3, followed by reception of images and photographing environment information meta information.

Then, at a step ST4, the frame number n is set to 0 (n=0), and going on to a step ST4, the pixel value comparison unit 114 encodes the frame n. At a step ST5, pixels that have been P region (a surface region) in any previous frame are set to a T region (a transparent region).

Additionally, at the step ST5, when all pixel values at $P_0(x, y)$, $P_1$ ($x+n \times S_{x1}$, $y+n \times S_{y1}$), $P_k$ ($x+n \times S_{x1}$, $y+n \times S_{y1}$) among pixels other than the above pixels match together or are within a predetermined threshold value, the $P_{tn}(x, y)$ is set as a P region to hold the value.

Next, processing goes on to a step ST6 to determine whether there is no N region (back region) left in the frame n, i.e., whether all the pixels have been P region once. At the step ST6, when it is determined that there is no N region left in the frame n (Yes), the flow goes to a step ST10, whereas when it is determined that not all N regions are gone in the frame n (No: N region remains), processing goes on to a step ST7.

At the step ST7, it is determined whether $n==n_{max}$ holds true, and when $n==n_{max}$ is determined to hold true, i.e., the shift of the frame n is determined to be a maximum shift amount $n_{max}$ (Yes), the flow goes to a step ST9. At the step ST9, the region(s) left in the frame n is(are) interpolated, and then the flow goes onto a step ST10. The interpolation of the N region(s) at the step ST9 is optional, and various known interpolation methods may be applied.

On the other hand, at the step ST7, when $n==n_{max}$ is determined not to hold true (No), the flow goes onto a step ST8 where n=n+1 is set, and then returns to the step ST5 to repeat the series of processing of the steps ST5 to ST9 described above.

Then, at the step ST10, the pixel value comparison unit 114 records N-region coordinates of the frame F0 and $P_1$ to $P_k$ (coordinates of each sub camera: (horizontal coordinate, vertical coordinate)) of the same coordinates as the N-region coordinates. The recording method is optional and various recording methods may be applied. In addition, the processing of the step ST10 is processing adapted only to the image encoding method of the fourth embodiment described above.

Figure 13:
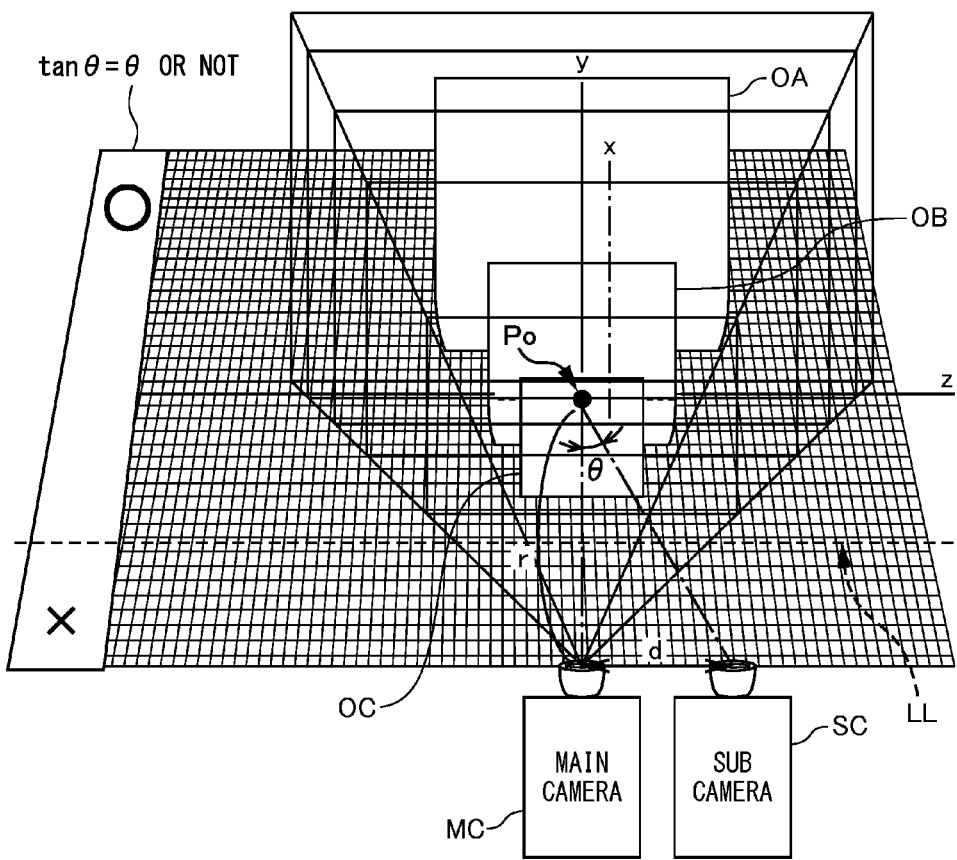
FIG. 13 is a diagram (1) for illustrating an example of a processing procedure by the image encoding method of the first embodiment.
Figure 14:
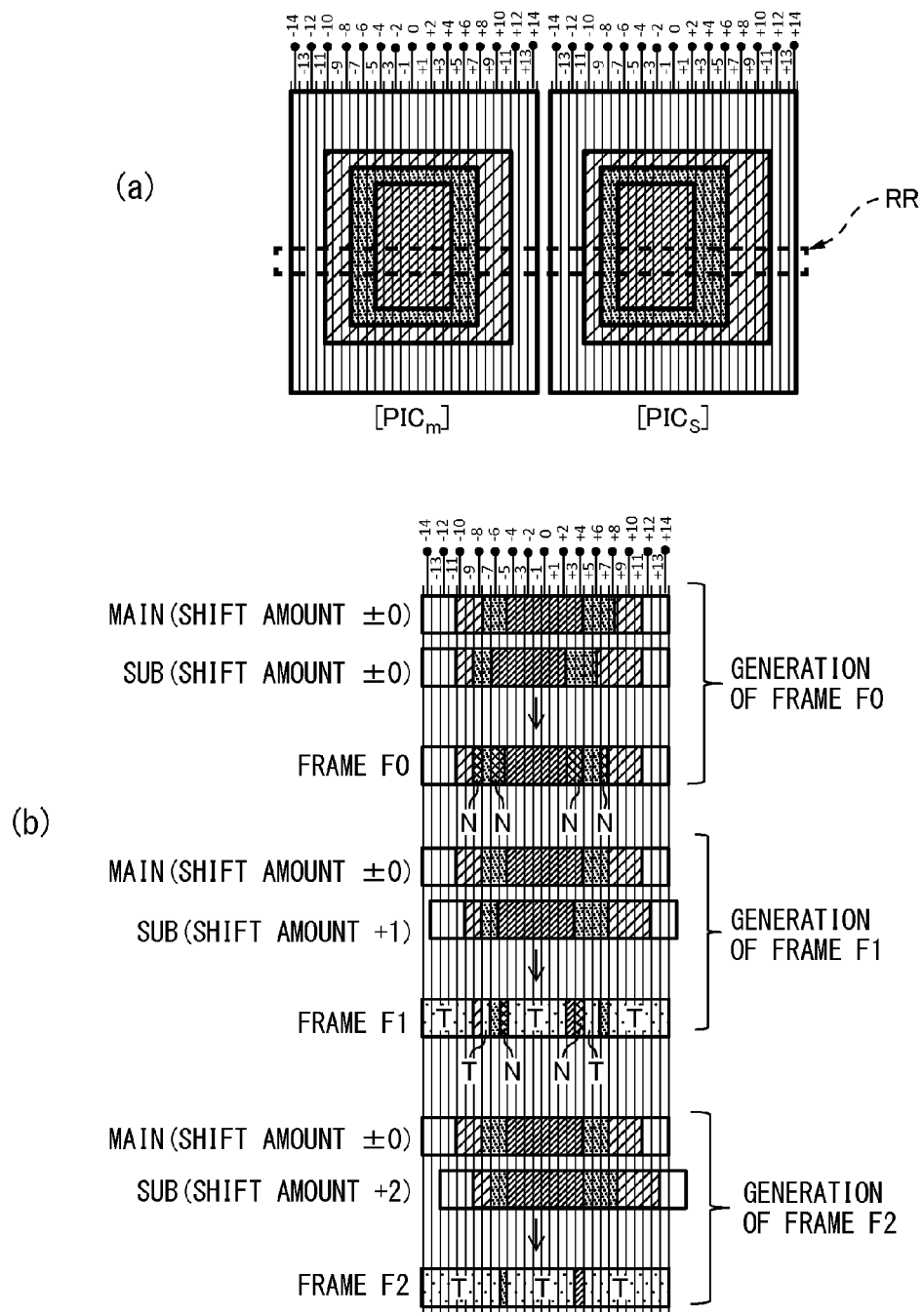
FIG. 14 is a diagram (2) for illustrating the example of the processing procedure by the image encoding method of the first embodiment.

Next, encoding processing will be described in detail. FIG. 13 and FIG. 14 are diagrams for illustrating an example of a processing procedure by the image encoding method of the first embodiment. As with FIG. 5 described above, objects (subjects) positioned from the back to the front are sequentially denoted as objects OA, OB, and OC. In the main camera MC and the sub cameras SC, movement amount ratios $R_{OA}$ to $R_{OC}$ of the respective objects on a screen at the time of viewpoint movement are assumed to be $R_{OA}:R_{OB}:R_{OC}=0:1:2$.

In other words, the object closer to the front (the one closer to the cameras MC and SC) moves through a larger distance with respect to viewpoint movement. In addition, since the object OA is located at a farther position equivalent to an infinite distance, the distance ratio thereof is assumed to be 0 (no movement).

The present embodiment assumes application to a minute viewpoint movement-adapted image, and it is assumed that $d/r=\tan\theta=\theta$ holds true. Accordingly, in FIG. 13, for example, objects positioned closer to the front from a borderline LL where $\tan\theta=\theta$ does not hold true are not included in images.

FIG. 14(a) depicts a main camera image $PIC_m$ and a sub camera image $PIC_s$ simultaneously captured by a main camera MC and a sub camera SC. FIG. 14(b) depicts generated frames (parallax-specific frames) F0 to F2. Numerical values (−14 to 0, 0 to +14) in the drawings represent horizontal coordinates on an image shift pixel basis and do not represent coordinates per pixel.

For simplifying the description, a condition will be added that pixel values are all the same within a pixel shift range. However, since it does not hold true in an actual image, pixel values are compared on a pixel basis (per pixel).

In addition, in FIG. 14(a), an aspect ratio of the images ($PIC_m$ and $PIC_s$) is vertically long. This is merely due to space limitations and does not have any special meaning. Then, in order to describe simply, a description will be given of only lines within a region RR surrounded by broken lines in FIG. 14(a). In other words, since the description of the first embodiment describes the image shift as being performed only in the horizontal direction, it is enough to only consider the same line, which means that it is enough to only describe the lines within the region RR.

As depicted in FIG. 14(b), first, pixel value comparison is made in a non-shift state to generate a frame F0. At this time, the backgrounds (BK) and the objects OA are similar throughout all the images and positioned at the same coordinates.

In this case, pixels match in the backgrounds of −14 to −11 and +12 to +14, the objects OA of −10, −9, and +9 to +11, the object OBs of −7, +5, and +6, and the objects OC of −4 to +2 and thus become P regions. Thereby, the frame F0 may be encoded.

Next, a frame F1 is generated. Specifically, the sub camera image $PIC_s$ is shifted in the right direction by 1, and in this state, pixel value comparison is made in regions that have not been the P regions in the frame F0. At this time, the objects OB are similar throughout all the images and positioned at the same coordinates.

In this case, pixels match in the objects OA of −8, the objects OB of −6 and +7, and the objects OC of +3. Regions of the frame F1 that have been the P regions in the frame F0 are set to T region. Thereby, the frame F1 is encoded.

Furthermore, a frame F2 is generated. Specifically, the sub camera image $PIC_s$ is further moved in the right direction by 1, and a pixel value comparison is made in regions that are neither the P regions nor the T regions of the frame F1. At this time, the objects OC are similar throughout all the images and positioned at the same coordinates.

In this case, pixels match in the objects OB of −5 and the objects OC of +4. Thereby, the frame F2 may be encoded. Then, since there are left no pixels that have not been P regions, the encoding processing is completed.

Figure 15:
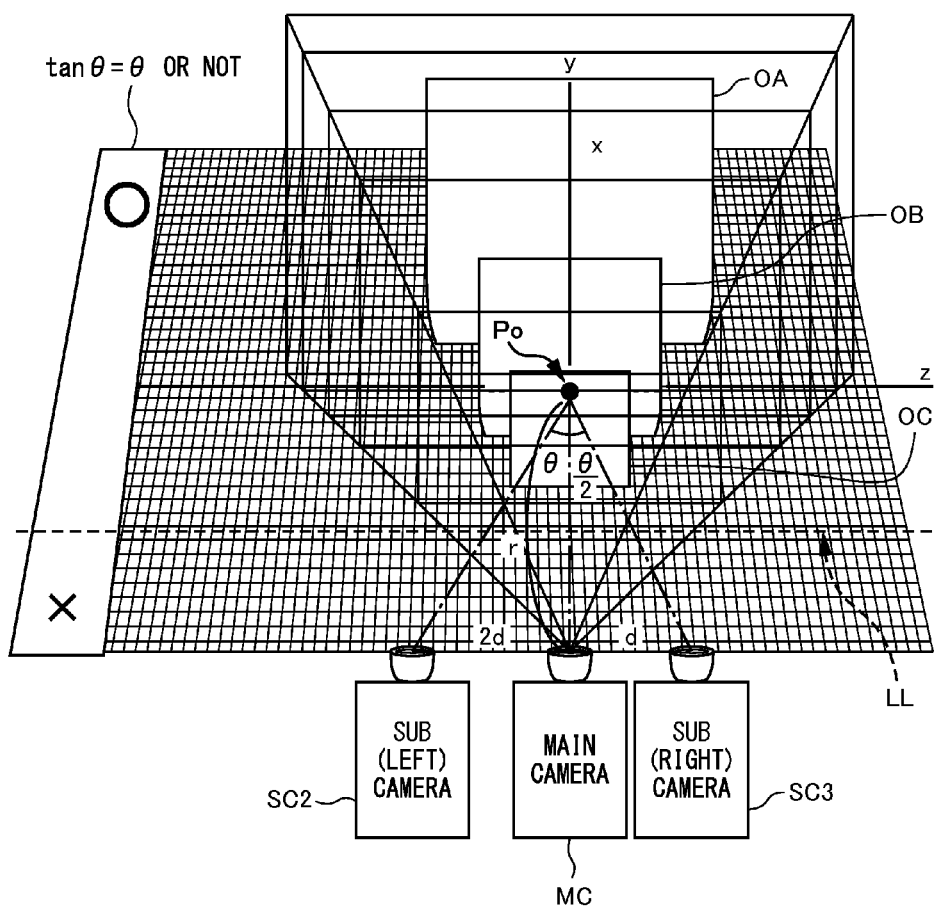
FIG. 15 is a diagram (1) for illustrating an example of a processing procedure by the image encoding method of the second embodiment.
Figure 16:
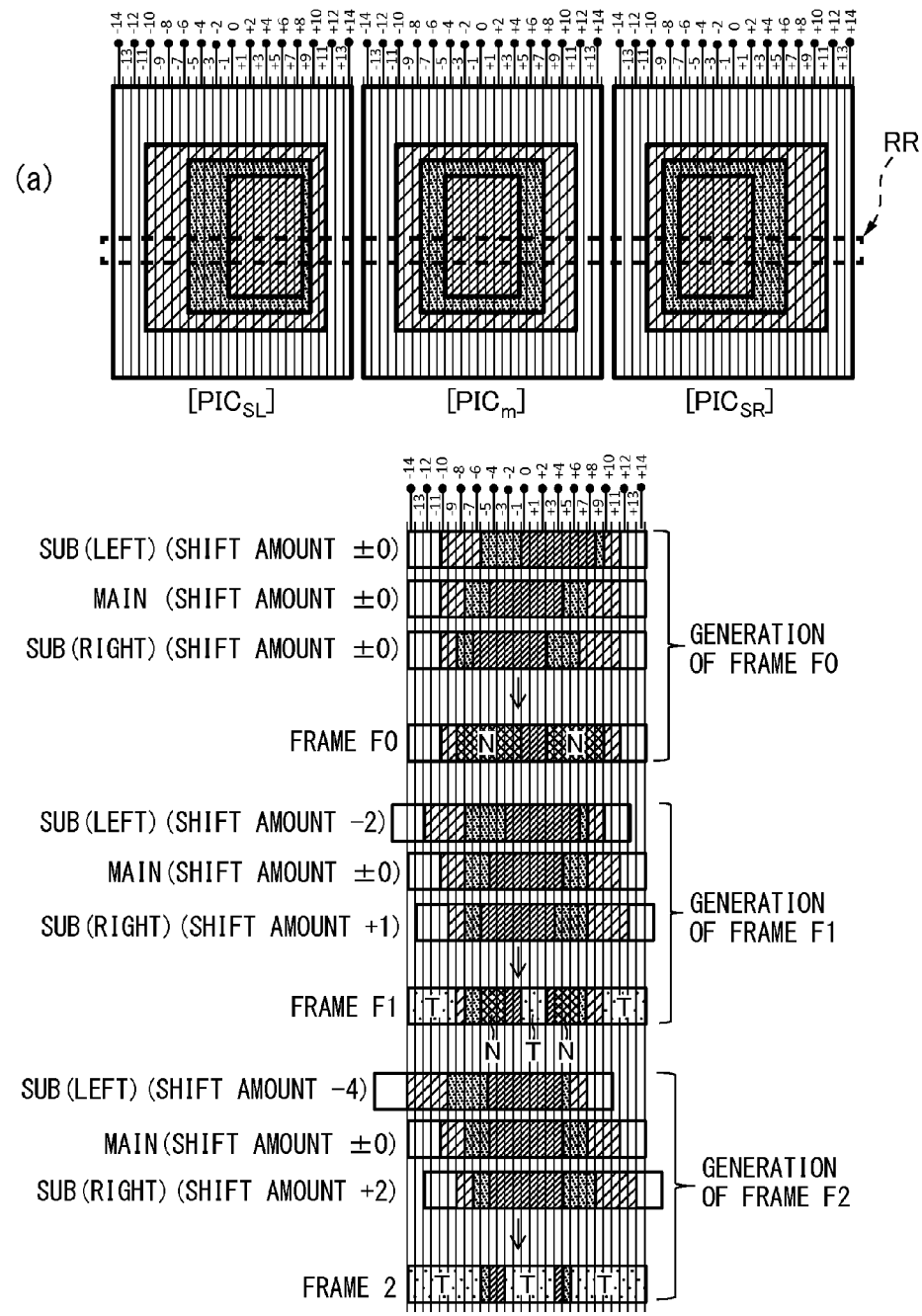
FIG. 16 is a diagram (2) for illustrating the example of the processing procedure by the image encoding method of the second embodiment.

FIG. 15 and FIG. 16 are diagrams for illustrating an example of a processing procedure by the image encoding method of the second embodiment. As with FIG. 7 described above, three cameras are aligned on a straight line (sub (left) $SC_L$/main MC/sub (right) $SC_R$).

In FIG. 7, the relationship of $2\times d_1=d_2$ has held true between the distance $d_1$ between the main camera MC and the sub (left) camera SC2 and the distance $d_2$ between the main camera MC and the sub (right) camera SC3. In contrast, in FIG. 15 and FIG. 16, a distance 2d between the main camera MC and the sub (left) camera $SC_L$ is twice the distance d between the main camera MC and the sub (right) camera $SC_R$. In addition, the objects OA to OC in the space are arranged in the same manner as those in FIG. 13.

FIG. 16(a) depicts a sub (left) camera image $PIC_{SL}$, a main camera image $PIC_m$, and a sub (right) camera image $PIC_{SR}$ simultaneously captured by the sub (left) camera $SC_L$, the main camera MC, and the sub (right) camera $SC_R$, and FIG. 16(b) depicts generated frames (parallax-specific frames) F0 to F2. In the description of the second embodiment as well, for simplifying the description, there will be described only lines within a region RR surrounded by broken lines in FIG. 16(a).

As depicted in FIG. 16(b), first, pixel value comparison is made in a non-shift state to generate a frame F0. At this time, backgrounds (BK) and objects OA are similar throughout all the images and positioned at the same coordinates.

In this case, pixels match in the backgrounds of −14 to −11 and +12 to +14, the objects OA of −10, −9, and +10 to +11, the objects OB of −7, +5, and +6, and the objects OC of 0 to +2 and thus become P regions. Thereby, the frame F0 may be encoded.

Next, a frame F1 is generated. Specifically, the sub (right) camera image $PIC_{SR}$ is moved in the right direction by 1 and the sub (left) camera image $PIC_{SL}$ is moved in the left direction by 2. In this state, a pixel value comparison is performed in regions that have not been the P regions in the frame F0. At this time, the objects OB are similar throughout all images and positioned at the same coordinates.

In this case, pixels match in the objects OA of −8, +8, and +9, the objects OB of −7, −6, and +7, and the objects OC of 0, +1, and +3. Regions of the frame F1 that have been the P regions in the frame F0 are set to T regions. Thereby, the frame F1 may be encoded.

Furthermore, a frame F2 is generated. Specifically, the sub (right) camera image $PIC_{SR}$ is additionally moved in the right direction by 1 and the sub (left) camera image $PIC_{SL}$ is additionally moved in the left direction by 2 to perform a pixel value comparison in regions that are neither the P regions nor the T regions of the frame F1. At this time, the objects OC are similar throughout all the images and positioned at the same coordinates.

In this case, pixels match in the objects OB of −5 and +5 and the objects OC of −4, −3, and +4. Thereby, the frame F2 may be encoded, and then, since there are left no pixels that have not been P regions, the encoding processing is completed.

Figure 17:
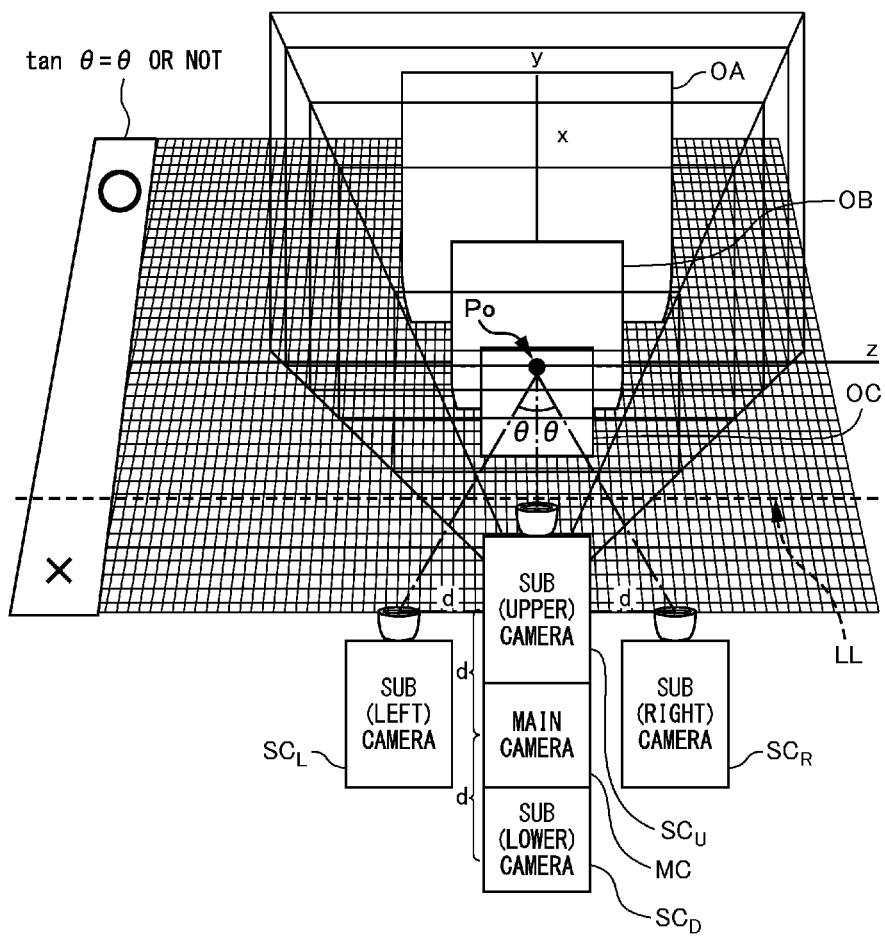
FIG. 17 is a diagram (1) for illustrating another example of the processing procedure by the image encoding method of the second embodiment.
Figure 18:
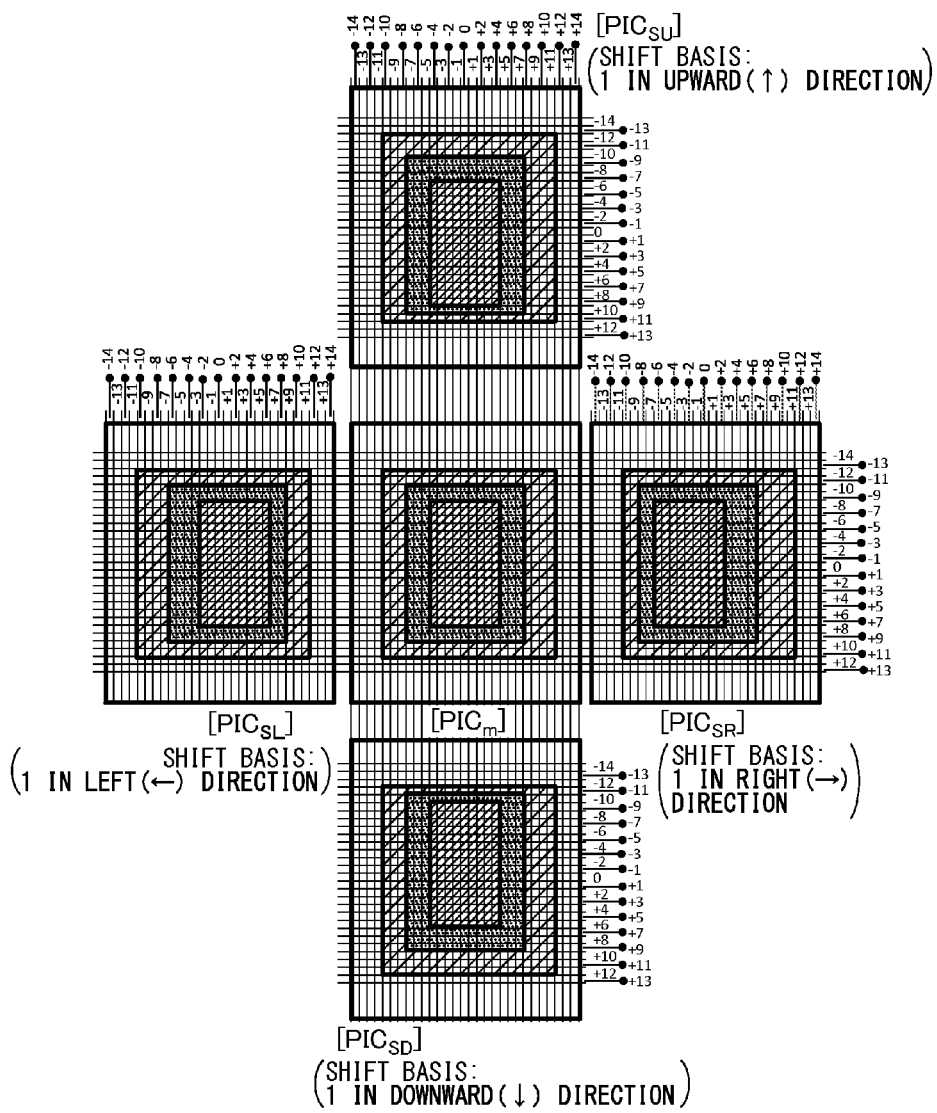
FIG. 18 is a diagram (2) for illustrating the other example of the processing procedure by the image encoding method of the second embodiment.
Figure 19:
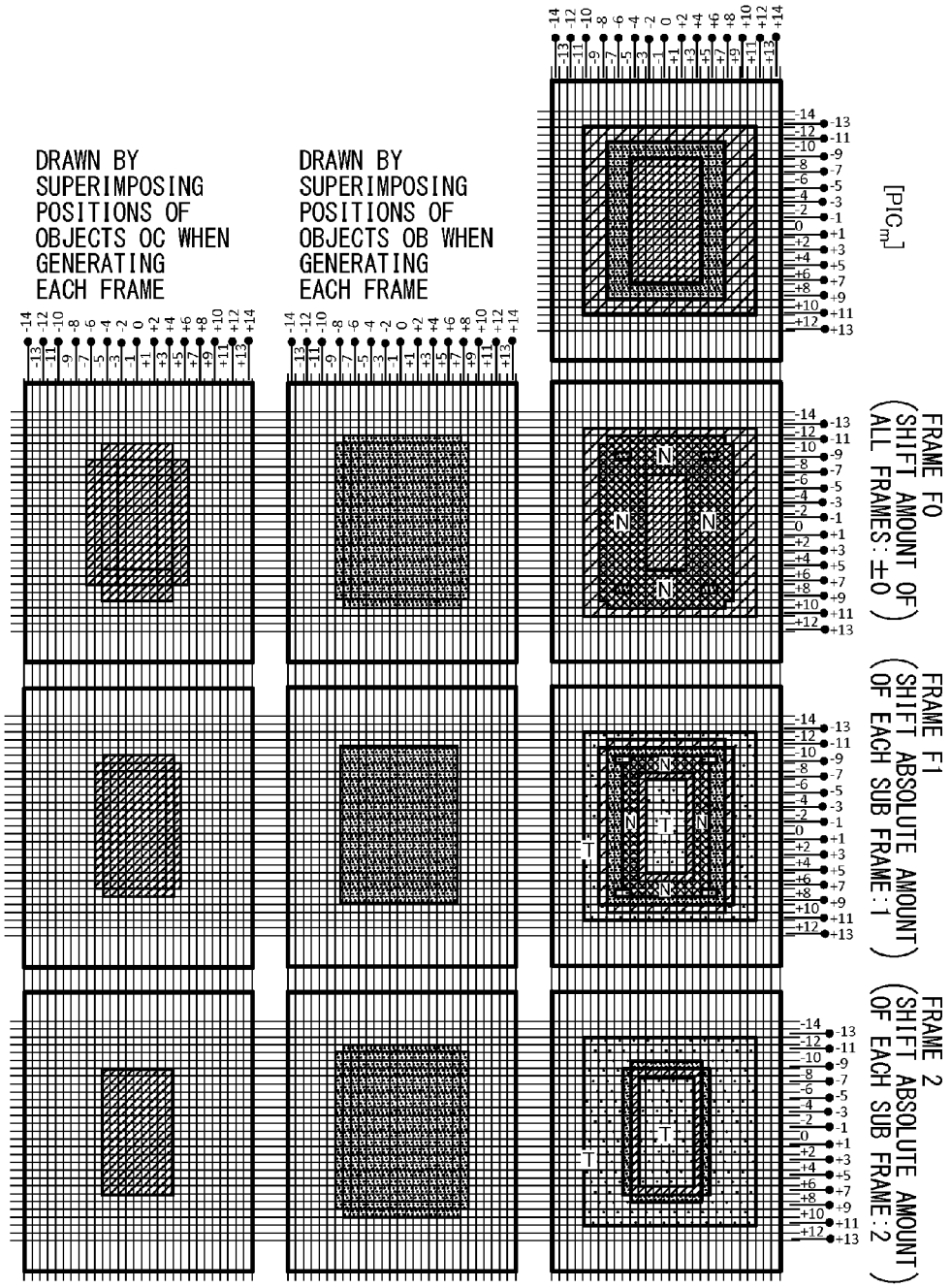
FIG. 19 is a diagram (3) for illustrating the other example of the processing procedure by the image encoding method of the second embodiment.

FIG. 17 to FIG. 19 are diagrams for illustrating another example of the processing procedure by the image encoding method of the second embodiment. While FIG. 15 and FIG. 16 described above have depicted the processing of the images ($PIC_{SL}$, $PIC_m$, and $PIC_{SR}$) captured by the three cameras ($SC_L$, MC, and $SC_R$) aligned on the straight line, FIG. 17 to FIG. 19 depict processing of images captured by five cameras located in a crossing manner.

Specifically, as depicted in FIG. 17, the five cameras are a main camera MC, a sub (left) camera $SC_L$ on the left of the main camera MC, a sub (right) camera $SC_R$ on the right thereof, a sub (upper) camera $SL_U$ on the upper side thereof, and a sub (lower) camera $SL_D$ on the lower side thereof.

The sub (left) camera $SC_L$—the main camera MC—the sub (right) camera $SC_R$ are aligned on a straight line, and horizontal positions of the cameras are assumed to be equal. In addition, the sub (upper) camera $SL_U$—the main camera MC—the sub (lower) camera $SL_D$ are also aligned on a straight line, and vertical positions of the cameras are assumed to be equal. Distances between the main camera MC and the respective sub cameras $SC_L$, $SC_R$, $SL_U$, and $SL_D$ are all equally d.

First, as depicted in FIG. 19, a pixel value comparison is made in a non-shift state to generate a frame F0. At this time, backgrounds (BK) and objects (OA) are similar throughout all the images and positioned at the same coordinates.

In this case, the background regions all match and become P regions, and the objects OA match in regions excluding regions where the object OB in each sub image shifts out (respective upper, lower, left, and right single lines), and become P regions.

Additionally, since a shifted part between the objects OC is large, the objects OB match in regions of only each two pixels in upper, lower, left, right, and oblique directions and thus the regions become P regions. The objects OC match in a rectangular region of columns ranging from −6 to −2 and rows ranging from −6 to +5, and thus the region becomes a P region. Thereby, the frame F0 may be encoded.

Next, a frame F1 may be generated. Specifically, the sub (right) camera image $PIC_{SR}$ is moved in the right direction, the sub (left) camera image $PIC_{SL}$ is moved in the left direction, the sub (upper) camera image $PIC_{SU}$ is moved in the upper direction, and the sub (lower) camera image $PIC_{SD}$ is moved in the lower direction, respectively, by 1 for each. Then, in this state, a pixel value comparison is made in regions that have not become P regions in the frame F0. At this time, the objects OB are similar throughout all the images and positioned at the same coordinates.

In this case, in the objects OA, the remaining regions all match together and thus become P regions, since a shifted part between the objects OB is cleared. In the objects OB, right and left each two lines and upper and lower each one line match together and thus become P regions, since the shifted part between the objects OC is cleared.

In addition, the entire shift amount between the objects OC becomes smaller, and outer peripheral single lines of the rectangular region that has matched in the frame F0 newly match together and thus become a P region. Regions of the frame F1 that have been the P regions in the frame F0 are set to T regions. Thereby, the frame F1 may be encoded.

Furthermore, a frame F2 is generated. Specifically, the sub (right) camera image $PIC_{SR}$, the sub (left) camera image $PIC_{SR}$, the sub (upper) camera image $PIC_{SU}$, and the sub (lower) camera image $PIC_{SD}$, respectively, are moved in the same direction by 1. Then, in this state, a pixel value comparison is made in regions that are neither the P regions nor the T regions of the frame F1. At this time, the objects OC are similar throughout all the images and positioned at the same coordinates.

In this case, respective single lines of the remaining inner peripheries of the objects OB and the remaining outer peripheries of the objects OC match together and thus become P regions. Then, since there are left no pixels that have not become P regions, the encoding processing is completed.

Thus, in the processing procedure by the image encoding method of the third embodiment, the processing procedure of the single camera group (the camera set) by the image encoding methods of the first and the second embodiments described above is similarly applied to the plurality of camera groups.

Furthermore, in the image encoding method of the fourth embodiment, for example, recording N regions of the frame F0 and pixel values at the coordinates thereof in the sub cameras in the first to the third embodiments relieves the shortage of drawing data of a background portion in viewpoint movement by a viewer when decoding.

The image encoding methods of the first to the fourth embodiments are performed, for example, by the image encoding apparatus (the encoding system) depicted in FIG. 9 and FIG. 10, or executed, by a central processing unit (CPU), as the image encoding program of the image encoding apparatus (the execution system) depicted in FIG. 11. Thus, three-dimensional image information may be encoded into a plurality of two-dimensional images. Next, a detailed description will be given of embodiments of an image decoding method and an image encoding apparatus.

[Decoding]

Using space information encoded in the manner as described above, pixel shift amounts in each frame to be drawn are calculated from information on a viewer's viewpoint position in a reproduction environment provided with a screen for displaying the space information and a viewpoint movement distance measurement unit for measuring a distance of a viewer's viewpoint movement.

Specifically, according to an image decoding method of a fifth embodiment (an embodiment of the image decoding method), pixels are shifted by a calculated shift amount in an ascending order of frame numbers from a frame F0 to perform overwrite drawing. In that case, pixels set to T regions (transparent regions) are not overwrite drawn.

Although the range of a viewpoint movement by a viewer is optional, the present description will illustrate only a viewpoint on a straight line that connects a main camera and each sub camera (an intermediate viewpoint between the main camera and the each sub camera). Deviation of the viewpoint movement from the straight line increases the number of unrecorded pixels, thereby leading to reduced viewpoint reproducibility.

In addition, in the case of the above-described encoding processing procedure, overwrite processing is performed in order from the frame F0, as with the order for generating the frames F0, F1, . . . at the time of encoding. Thereby, there may be generated viewpoint images from the main camera and each sub camera, and from an intermediate viewpoint between the main camera and the each sub camera.

In this manner, the image decoding method and the image decoding apparatus according to the present embodiment may generate viewpoint images of interest by merely performing simple processing, "shift+overwrite drawing", for example, without performing geometry calculation.

Furthermore, according to the image encoding method of the fourth embodiment described above, for example, by using the N regions (back regions) of the frame F0 recorded and pixel values at the coordinates thereof in the sub cameras, it is possible to relieve the shortage of drawing data of a background portion in viewpoint movement by a viewer when decoding.

Specifically, according to an image decoding method of a sixth embodiment (another embodiment of the image decoding method), when decoding by applying the image decoding method of the fifth embodiment described above, for example, the N regions of the frame F0 are replaced by data of an image (a sub camera image) of a sub camera corresponding to a viewpoint movement direction. Thereby, missing pixels at the time of viewpoint movement may be easily interpolated.

In addition, after drawing the frame, overwrite drawing is made in a image frame (in which regions other than the N regions of the frame F0 are assumed to be P regions (surface regions)) of the corresponding sub camera, data may be replaced without any specific processing.

Figure 20:
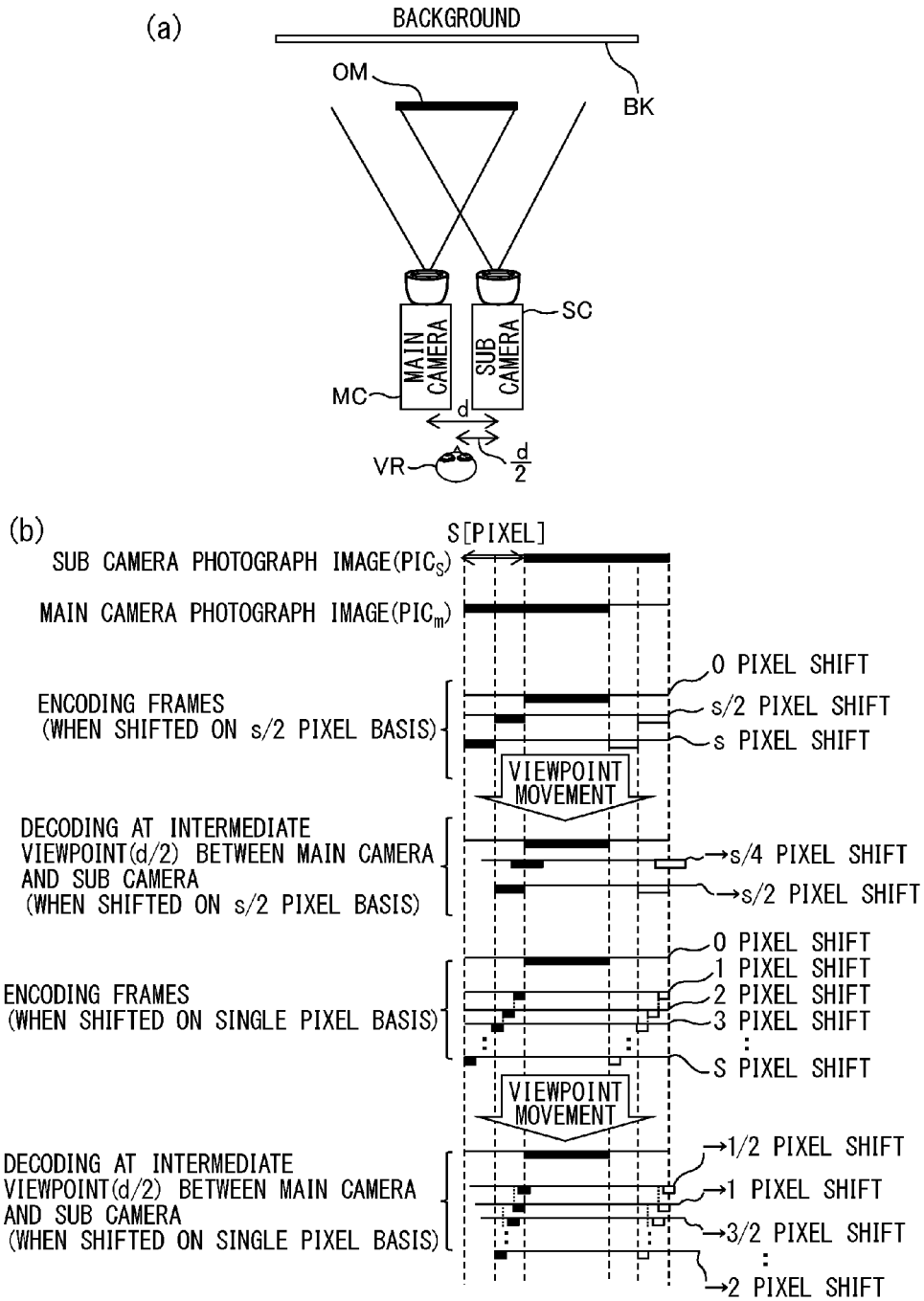
FIG. 20 is a diagram for illustrating an example of processing by an image decoding method according to a present embodiment.

FIG. 20 is a diagram for illustrating an example of the processing by the image decoding method according to the present embodiment. For example, the diagrams are for illustrating decoding processing when the three-dimensional information by the two cameras (the main camera MC and the sub camera SC) described by referring to FIG. 6 is encoded.

A description will be given of a case, as depicted in FIG. 20(a), where a viewer VR is located exactly in an intermediate position of the distance d between the main camera MC and the sub camera SC, i.e., a case of generating a decoded image at a viewpoint position of d/2.

According to the image decoding method according to the present embodiment, after shifting according to a viewpoint position, overwrite drawing is performed in order from a frame with the smallest number, i.e., in order of: frame F0→F1→F2→ . . . . As described above, since the viewpoint position is exactly in the intermediate position between the main camera MC and the sub camera SC, it is enough to merely shift by the number of pixels corresponding ½ of a shift amount in the sub camera image (the sub camera image) when generating each frame.

Specifically, when a total number of encoding frames is assumed to be g and the numbers of pixels on horizontal and vertical shift bases in the sub camera SC are assumed to be $s_{xf}$ and $s_{yf}$, a shift amount of a frame a (1≤a≤g) is (a/2)$s_{xf}$ pixels in the horizontal direction and (a/2)$s_{yf}$ pixels in the vertical direction. In the shift direction, shift is made in opposite to the viewpoint movement direction as seen from the main camera MC.

In other words, at this time, as depicted in FIG. 20(b), there is generated an intermediate viewpoint image where parallax portions are superimposed and the object is shifted to the right by s/2. Although the right side of the object is not shifted out, performing encoding by including a viewpoint extension camera allows the right side thereof to be shifted out. The shifted-out region is filled, for example, by interpolation using the image decoding method of the sixth embodiment (the second embodiment of the image decoding method), which will be described in more detail later, thereby generating an intermedium viewpoint image.

The shift amount is equal regardless of the depth of the object in the space as long as it is within the same encoded frame. Thus, for example, without performing geometry calculation, an image according to a viewpoint position after movement may be easily generated.

Figure 21:
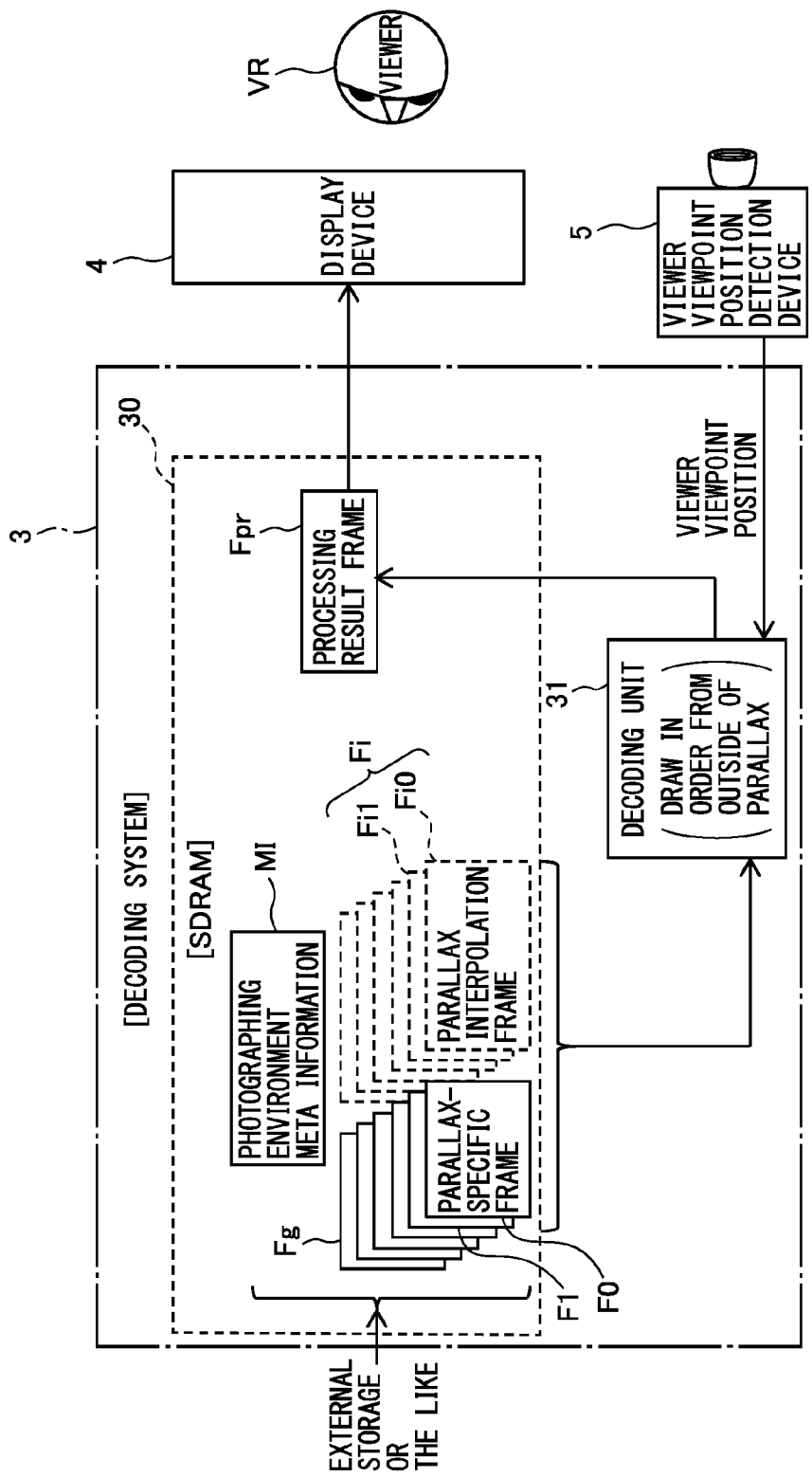
FIG. 21 is a block diagram depicting an example of a decoding system to which the image decoding method of the present embodiment is applied.

FIG. 21 is a block diagram depicting an example of a decoding system to which the image decoding method of the present embodiment is applied. In FIG. 21, reference sign 3 denotes a decoding system (an image decoding apparatus), 4 denotes a display device, and 5 denotes a viewer viewpoint position detection device.

As depicted in FIG. 21, the decoding system 3 includes a memory (SDRAM) 30 and a decoding unit 31. The SDRAM 30 stores (memorizes) photographing environment meta information MI, parallax-specific frames F0 to Fg and parallax interpolation frames Fi0, Fi1, etc., and a processing result frame $F_{pr}$ generated by the encoding system 1.

The photographing environment meta information MI, parallax-specific frames F0 to Fg and parallax interpolation frames Fi0, Fi1, etc., are those already acquired by the image encoding apparatus of the present embodiment, and the processing result frame $F_{pr}$ is one generated by decoding processing by the decoding unit 31. Additionally, the processing result frame $F_{pr}$ is, for example, image-displayed on the display device 4 of a liquid crystal display apparatus or the like to be viewed by a viewer VR.

The viewer viewpoint position detection device 5 is attached to, for example, the display device 4 to detect a viewpoint position of the viewer VR by various known techniques and supply the viewpoint position information of the viewer to the decoding unit 31.

embodiments of devices applicable as the display device 4 include various devices such as a large liquid crystal display for displaying moving images by TV broadcasting or Blu-ray Disc and a small display of a mobile device such as a smart phone or a tablet. In addition, the photographing environment meta information MI includes a positional relationship between the respective cameras in the photographing device 2, photographing conditions depending on mounting, and environment information at the time of photographing.

The decoding unit 31, for example, receives the various data stored in the SDRAM 30, such as the photographing environment meta information MI and the parallax-specific frames F0 to Fg and parallax interpolation frames Fi0, Fi1, etc., and the viewer viewpoint position information from the viewer viewpoint position detection device 5 to perform decoding. The decoding unit 31 draws, for example, in order from the outside of parallax.

Figure 22:
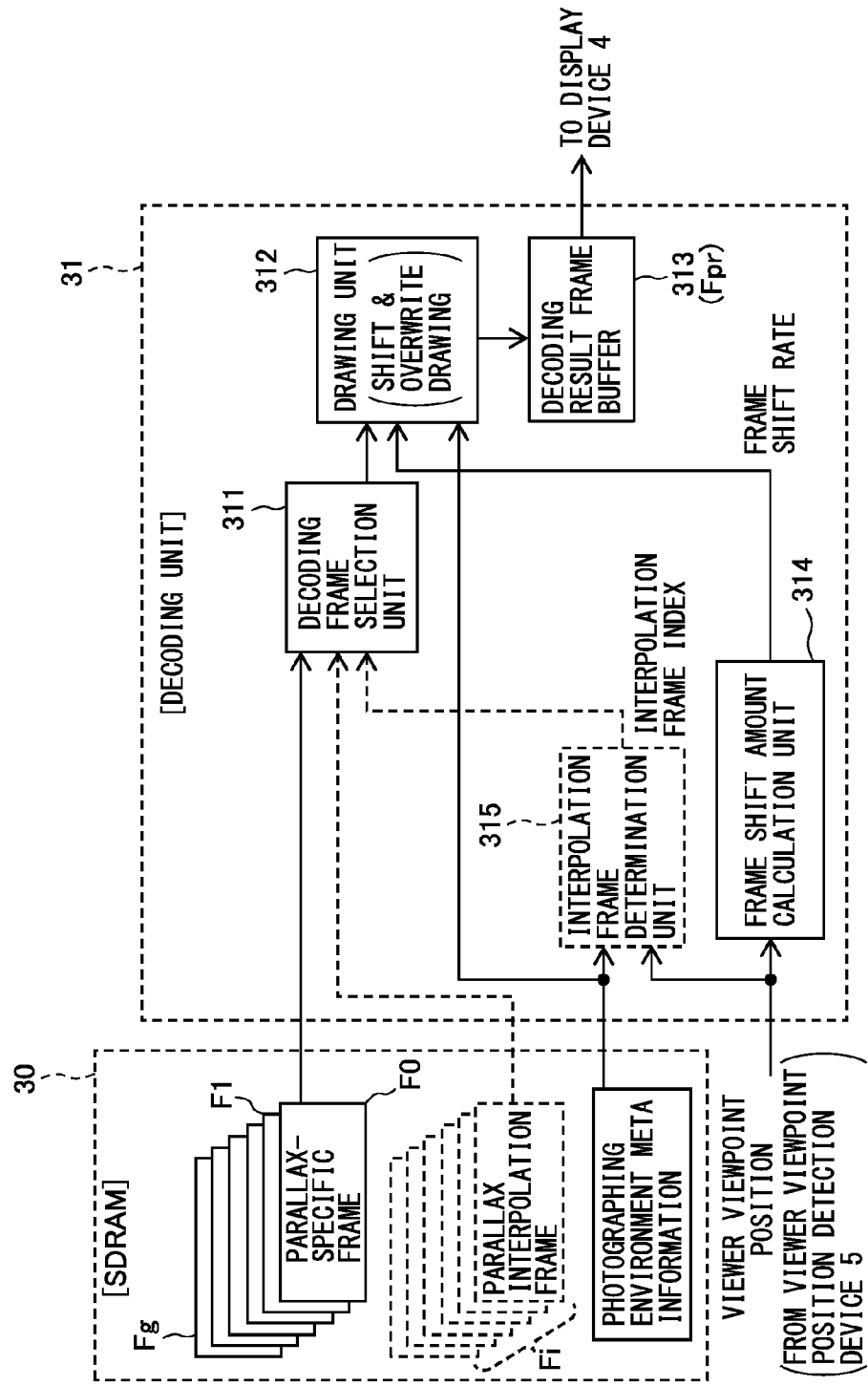
FIG. 22 is a block diagram depicting in more detail a decoding unit of the decoding system depicted in FIG. 21.

FIG. 22 is a block diagram depicting in more detail the decoding unit in the decoding system depicted in FIG. 21. As depicted in FIG. 22, the decoding unit 31 includes a decoding frame selection unit 311, a drawing unit 312, a decoding result frame buffer 313, a frame shift amount calculation unit 314, and an interpolation frame determination unit 315.

The interpolation frame determination unit 315 receives the parallax interpolation frame Fi and the photographing environment meta information MI stored in the SDRAM 30 to generate an interpolation frame index and output to the decoding frame selection unit 311.

The decoding frame selection unit 311 receives the photographing environment meta information MI and the parallax-specific frames F0 to Fg stored in the SDRAM 30 and the interpolation frame index from the interpolation frame determination unit 315 and selects a decoding frame to output it to the drawing unit 312. The frame shift amount calculation unit 314 calculates a shift amount on the basis of the viewer viewpoint position information from the viewer viewpoint position detection device 5 and outputs the shift amount to the drawing unit 312.

The drawing unit 312 receives the frame data selected by the decoding frame selection unit 311, the photographing environment meta information MI stored in the SDRAM 30, and the shift amount calculated by the frame shift amount calculation unit 314 and performs shift and drawing to generate a decoding result frame.

The decoding result frame generated by the drawing unit 312 is output to the display device 4 via, for example, the decoding result frame buffer 313, or is stored as the decoding result frame $F_{pr}$ in the SDRAM 30. The parallax interpolation frames stored in the SDRAM 30 and the interpolation frame determination unit 315 are those adapted to the image encoding method of the fourth embodiment described above.

Figure 23:
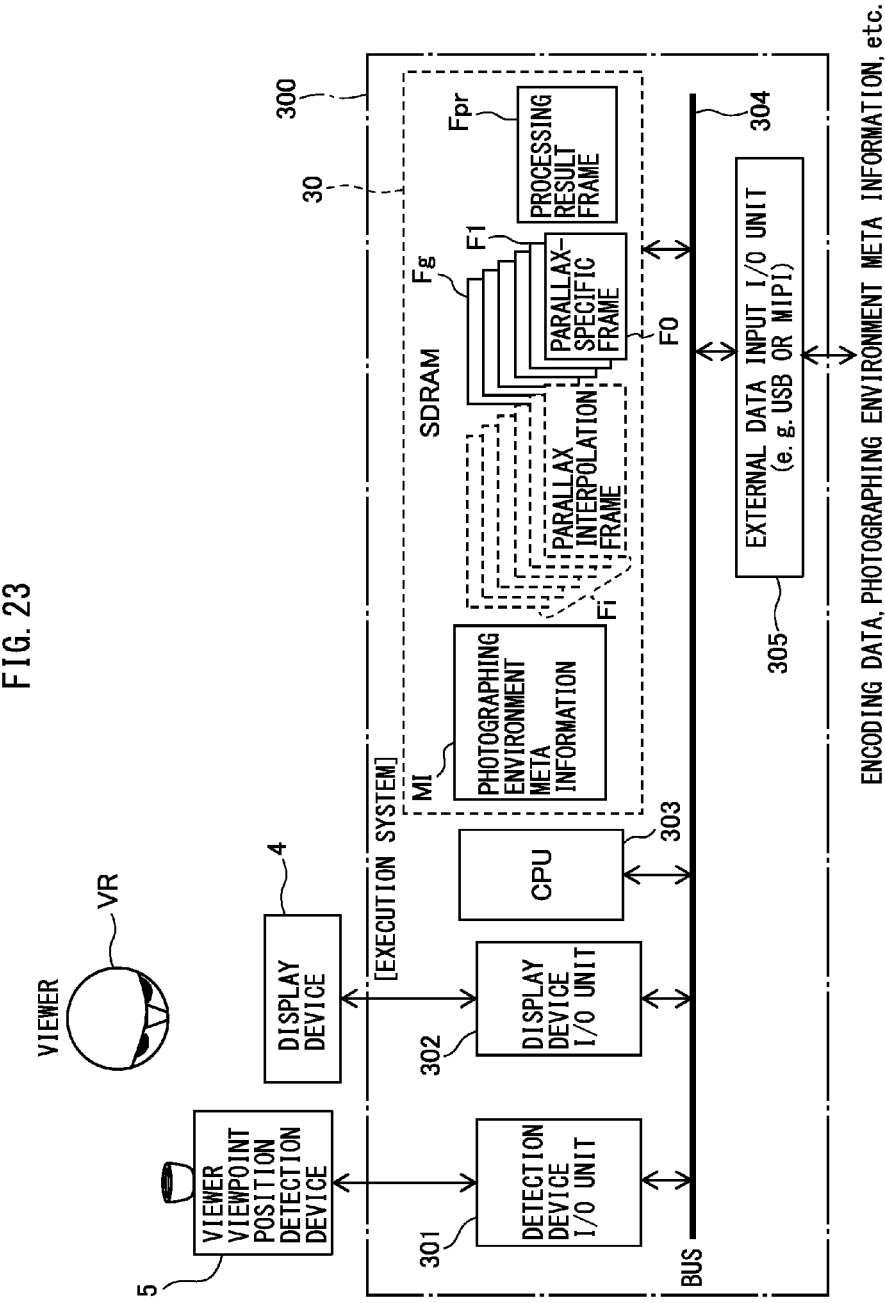
FIG. 23 is a block diagram depicting an example of an execution system to which an image decoding program of the present embodiment is applied.

FIG. 23 is a block diagram depicting an example of an execution system to which an image decoding program of the present embodiment is applied. The image decoding method of the present embodiment may also be achieved, for example, as an image decoding program to be executed by a central processing unit.

As depicted in FIG. 23, an execution system (an image decoding apparatus) 300 includes a SDRAM 30, a detection device I/O unit 301, a display device I/O unit 302, a CPU (central processing unit) 303, a bus 304, and an external data input I/O unit 305.

The detection device I/O unit 301 transmits and receives signals to and from the viewer viewpoint position detection device to acquire information on the viewpoint position of a viewer. The display device I/O unit 302 transmits and receives signals to and from the display device 4 to cause the display device 4 to display the processing result frame (decoded image data: viewpoint decoded image) $F_{pr}$.

The SDRAM 30 stores, for example, the photographing environment meta information MI, the parallax-specific frames F0 to Fg, the parallax interpolation frames Fi, and the processing result frame $F_{pr}$, as described above. The external data input I/O unit 305 receives, for example, encoded data, photographing environment meta information MI, and the like from outside or performs transmits and receives other various kinds of data. embodiments of devices applicable as the external data input I/O unit 305 include USB and MIPI.

The CPU 303 executes the image decoding program of the present embodiment, and receives, for example, the photographing environment meta information MI, the parallax-specific frames F0 to Fg, and the parallax interpolation frames Fi stored in the SDRAM 30 and the viewer viewpoint position information to perform decoding processing.

The program to be executed by the CPU 303 may be stored in, for example, an external memory (not shown) in advance and may cause the CPU 303 to execute the program via the external data input I/O unit 305. Alternatively, the program to be executed by the CPU 303 may also be stored in, for example, a nonvolatile memory such as a flash memory incorporated in the execution system 300.

Figure 24:
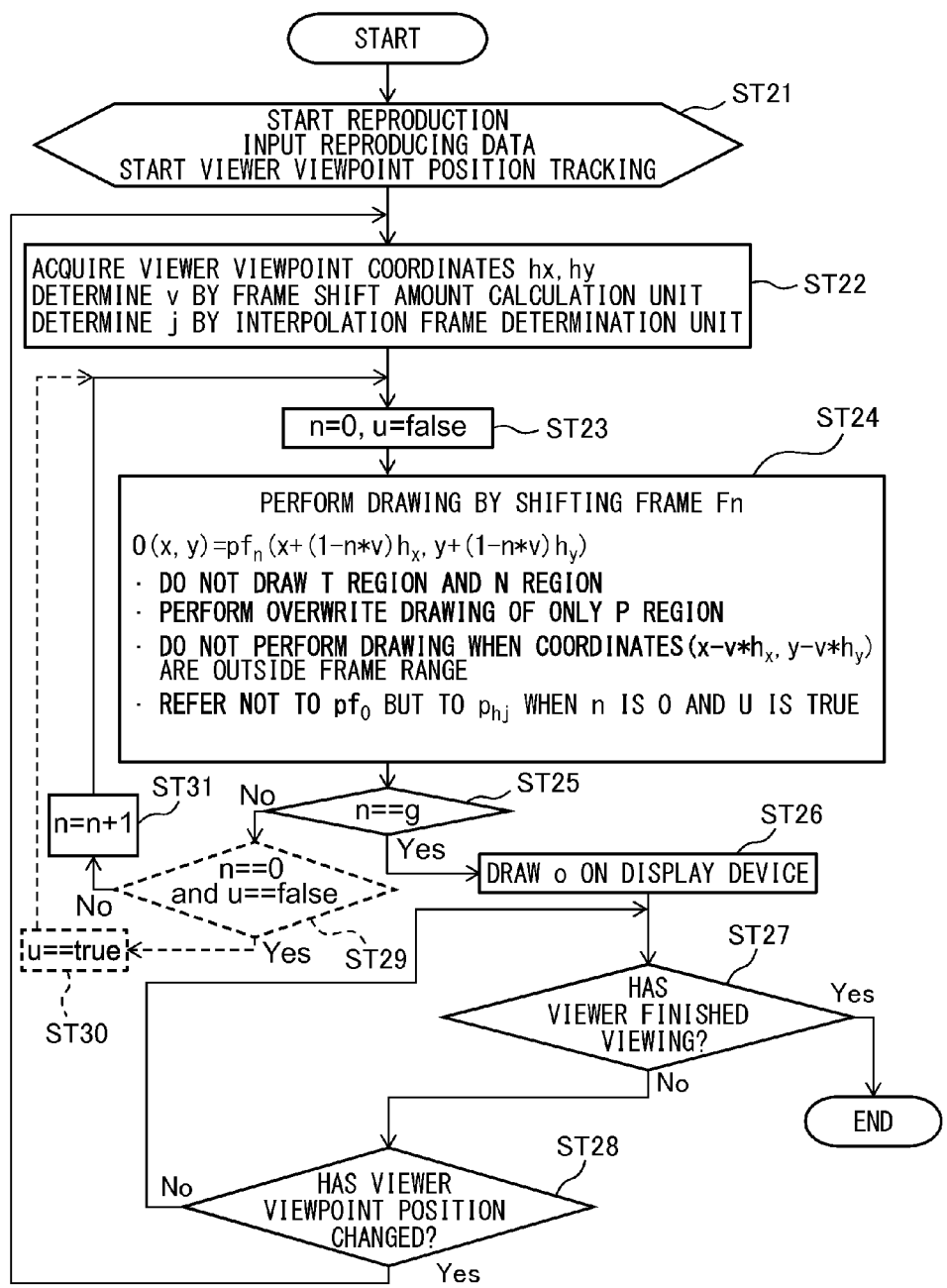
FIG. 24 is a flowchart for illustrating an example of processing in the image decoding method of the present embodiment.

FIG. 24 is a flowchart for illustrating an example of processing in the image decoding method of the present invention. In the description below, reference sign x denotes a horizontal index, y denotes a line index, e denotes a parallax width, and n denotes a frame count (frame number).

In addition, g denotes the total number of frames, i denotes a parallax data index, v denotes a ratio of a shift amount of frame F1 with respect to a distance of viewpoint movement by a viewer, and $h_x$ and $h_y$ denote a horizontal coordinate and a vertical coordinate (viewer viewpoint coordinates) of the head portion of the viewer detected by the viewer viewpoint position detection device. When $h_x = h_y = 0$ holds, the visual field is the same as that of the main camera MC.

Furthermore, o(horizontal coordinate, vertical coordinate) denotes decoded image data (viewpoint decoded image, decoded image), j denotes a sub camera index for N region interpolation of frame F0, and $p_{hj}$ (horizontal coordinate, vertical coordinate) denotes sub camera image (j=1, 2, . . . , k) for N region interpolation of frame F0. In the frame F0, in the coordinates of N regions, $p_{hj}(x, y) = p_k(x, y)$ holds true, and in the coordinates of P regions in the frame F0, $p_{hj}(x, y) = T$ region holds true.

As depicted in FIG. 24, when image decoding processing starts, reproduction starts at a step ST21. Specifically, reproduction data is input to start tracking of a viewpoint position of a viewer VR by the viewer viewpoint position detection device 5.

Additionally, going on to a step ST22, viewer viewpoint coordinates ($h_x$, $h_y$) are acquired, the ratio v is determined by the frame shift amount calculation unit 314, and the sub camera index j is determined by the interpolation frame determination unit 315.

Regarding the calculation of v, for example, when the viewer VR moves his or her viewpoint from the main camera (MC) at the time of encoding to the position of a sub a camera ($SC_a$), the horizontal and vertical movements of the viewer VR detected by the viewer viewpoint position detection device 5 are replaced with the number of pixels of the encoding camera. In other words, when values replaced with the number of pixels are assumed to be $h_{xa}$ and $h_{ya}$, v may be obtained by $v = (s_{xa}^2 + s_{ya}^2)^{1/2} / (h_{xa}^2 + h_{ya}^2)^{1/2}$. In addition, examples applicable as a method for determining the sub camera index j include a method for selecting a sub camera having a smallest distance between a current viewpoint position of the viewer VR and a straight line connecting the main camera and the sub camera.

Next, at a step ST23, n=0 and u=false are assumed to hold, and then the flow goes on to a step ST24, where the frame Fn is shifted to perform drawing. In other words, $o(x, y) = pf_x(x + (1-n \times v)h_x, y + (1-n \times v)h_y)$. Drawing of T regions and N regions are not performed, and overwrite drawing of only P regions is performed. When the coordinates ($x - v \times h_x$, $y - v \times h_y$) are outside the range of the frame, drawing is not performed. In addition, when n is 0 and u is true, i.e., n=0 and u=true hold, not $pf_0$ but $pf_j$ will be referred to.

Furthermore, going on to a step ST25, it is determined whether n==g holds. When n==g is determined to hold (Yes), the flow goes on to a step ST26, whereby the decoded image data o is drawn on the display device 4 and then, the flow goes on to a step ST27.

At the step ST27, it is determined whether the viewer VR has finished viewing. When the viewer VR is determined to have finished viewing (Yes), the image decoding processing is finished. When the viewer VR is determined not to have finished viewing (No), the flow goes on to a step ST28.

At the step ST28, it is determined whether there is any change in the viewpoint position of the viewer VR. When it is determined that there is a change in the viewpoint position thereof (Yes), the flow returns to the step ST22 to repeat the same processing. When it is determined that there is no change (No), the flow returns to the step ST27. In other words, when the viewer VR moves his or her viewpoint, processing corresponding to a new viewpoint position is performed, whereas when the viewer VR does not move his or her viewpoint, the state is maintained until the viewer finishes viewing.

On the other hand, at the step ST25, when it is determined that n==g does not hold (No), the flow goes to a step ST29, where it is determined whether n==0 and u==false hold. When both thereof are determined to hold (Yes), the flow goes on to a step ST30, where u==true is assumed to hold, and the flow returns to the step ST23. When it is determined at the step ST29 that n==0 and u==false do not hold (No), the flow goes on to a step ST31, where n=n+1 is assumed to hold, and the flow returns to the step ST23.

The steps ST29 to ST31 are decoding processing corresponding to the image encoding method of the fourth embodiment described above, and the decoding process allows the relief of shortage of drawing data of a background portion in viewpoint movement by the viewer VR when decoding. In this example, a flag is prepared, and an interpolation image is overwritten after the frame F0 is drawn.

Next, a description will be given of a reproduction environment assumed in decoding (when horizontal viewpoint movement is performed). Reproduction (viewing) environment assumes, for example, an environment where the viewer VR is positioned substantially in front of the display device 4, such as a typical environment where the viewer VR views TV.

In addition, the viewer VR is assumed to be positioned at an appropriate distance for viewing (a distance at which the display device 4 substantially matches a visual angle of images). Accordingly, the position of the viewer VR substantially matches a focus position at the time of photographing.

Furthermore, by applying various known methods as the reproduction environment, the viewpoint position of the viewer VR is assumed to be detectable by the viewer viewpoint position detection device 5, and the detected viewpoint position information is assumed to be outputtable to the decoding unit 31 substantially at real time.

The viewer viewpoint position detection device 5 may be, for example, a face recognition technique using an optical camera or the like, and the configuration thereof is not limited. In addition, the viewer viewpoint position detection device 5 may be incorporated in the display device 4, but may also be an independent device. In such a reproduction environment, the viewer VR is assumed to perform a minute viewpoint movement, such as moving his or her head (performing a parallel movement).

Figure 25:
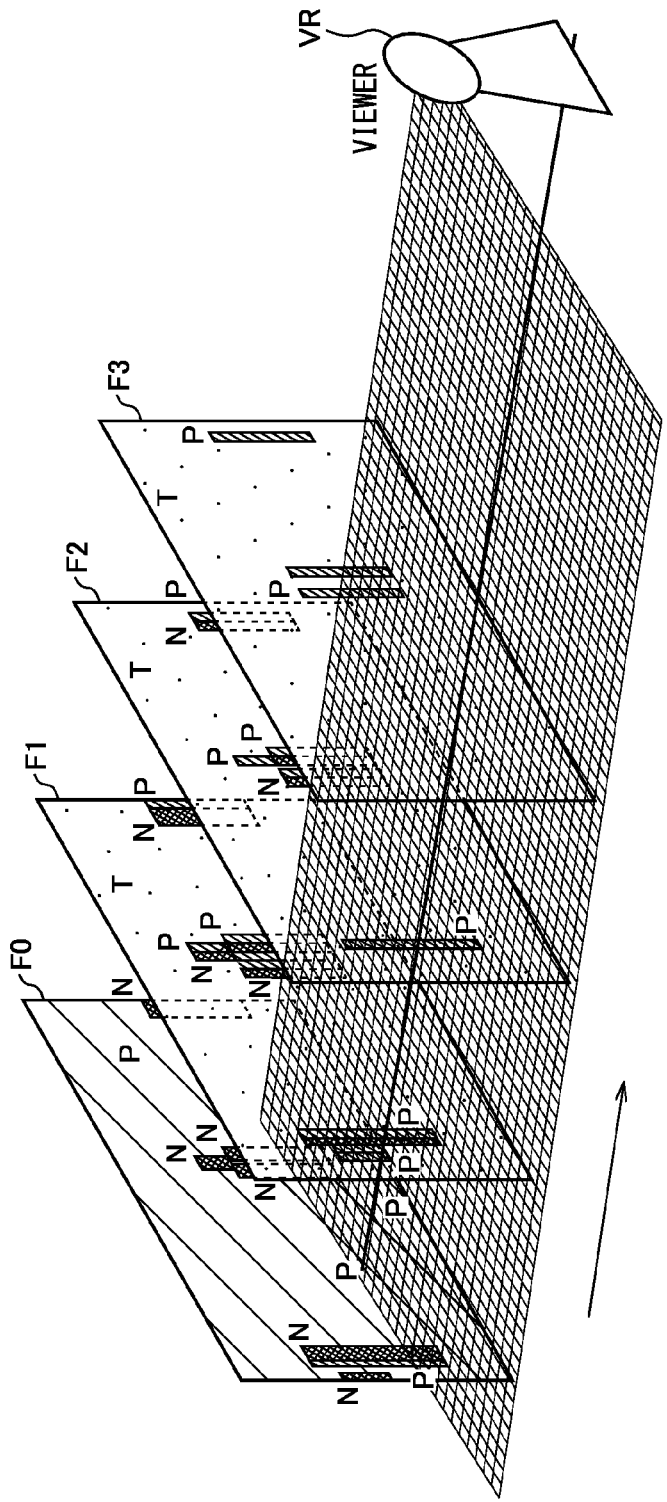
FIG. 25 is a diagram for illustrating processing when there is no viewpoint movement in the image decoding method of the present embodiment.

FIG. 25 is a block diagram for illustrating processing when there is no viewpoint movement in the image decoding method of the present embodiment. As depicted in FIG. 25, when the viewer VR does not move his or her viewpoint (when there is no viewpoint movement), $h_x=h_y=0$ holds, and in this state, overwrite drawing is performed in order of frame F0, F1, F2, and F3.

Pixels of T regions (transparent regions) and N regions (back regions) are not overwritten. In addition, P regions (surface regions) in each frame are not overwritten and left. As a result, a parallax as seen from the main camera MC is restored as it is, whereby the same image as the image $PIC_m$ of the main camera MC is restored.

Figure 26:
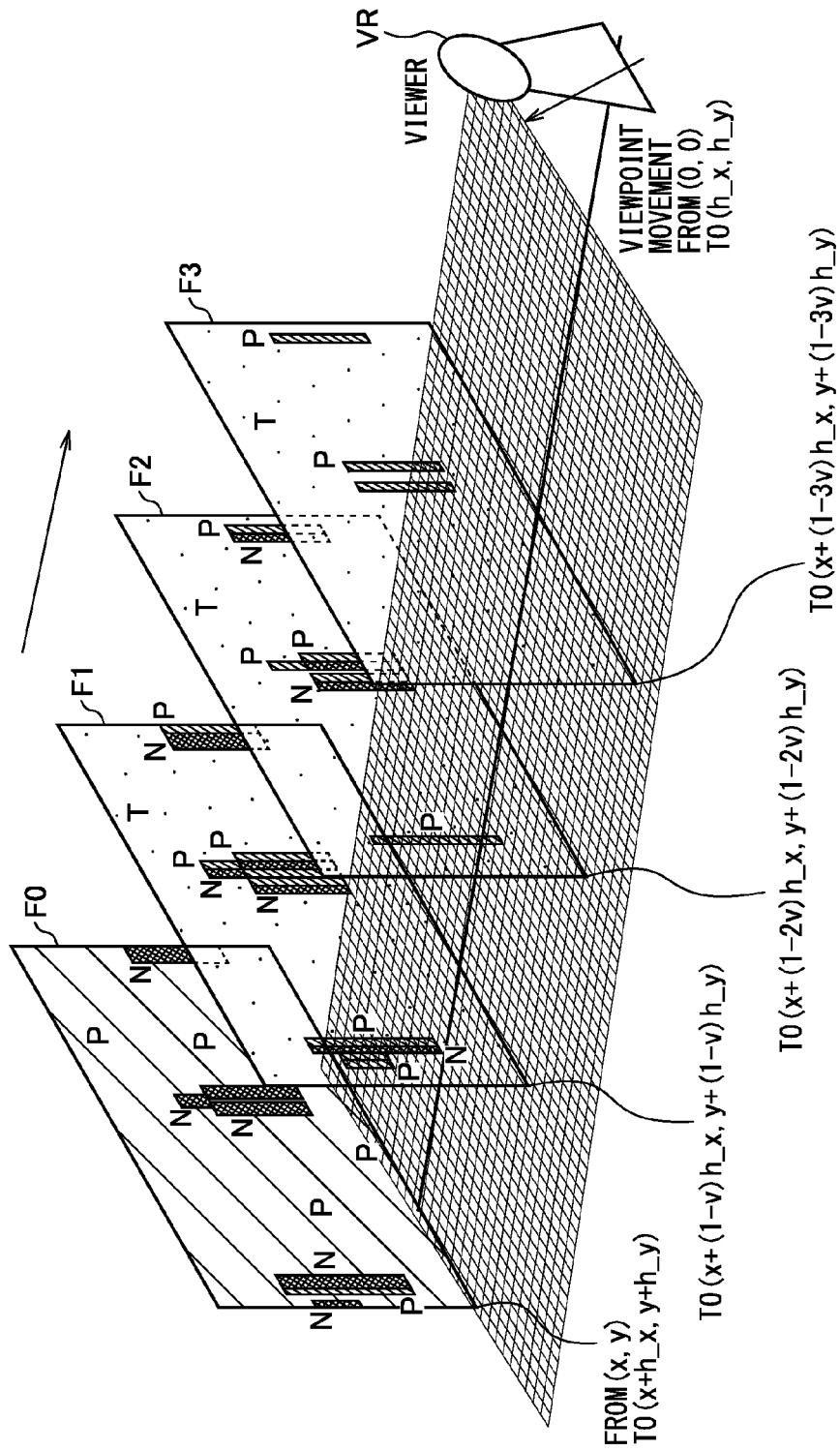
FIG. 26 is a diagram for illustrating processing when there is a viewpoint movement in the image decoding method of the present embodiment.

FIG. 26 is a diagram for illustrating processing when there is a viewpoint movement in the image decoding method of the present embodiment. As depicted in FIG. 26, when the viewer VR moves his or her viewpoint (there is a viewpoint movement), $h_x \neq 0$ or $h_y \neq 0$ holds.

When the viewer VR is located in a position other than the front of the display device 4, the shift amount of frames is changed to generate an intermediate viewpoint. At the time of viewpoint movement, two changes are applied to the shift amount.

Specifically, a first shift amount change is shifting from $(x, y)$ to $(x+h_x, y+h_y)$ in order to adapt the entire screen to the position of the viewer VR. Additionally, a second shift amount change is shifting by a different amount per frame from $(x, y)$ to $(x-n\times v\times h_x, y-n\times v\times h_y)$ in order to generate a parallax of the viewpoint position of the viewer VR regarding frames after the frame F1.

As a result, the frame Fn is shifted from $(x, y)$ to $(x+(1-n\times v)h_x, y+(1-n\times v)h_y)$ to be drawn. In other words, the frame F0 is shifted from $(x, y)$ to $(x+h_x, y+h_y)$, the frame F1 is shifted from $(x, y)$ to $(x+(1-v)h_x, y+(1-v)h_y)$, and the frame F2 is shifted from $(x, y)$ to $(x+(1-2v)h_x, y+(1-2v)h_y)$, respectively, to be drawn.

Thus, according to the image decoding method of the present embodiment, the frame is shifted by an amount calculated on the basis of the viewpoint position of the viewer to perform overwrite drawing at the time of decoding, thereby allowing restoration of an image at the viewpoint position of the viewer. This advantageous effect may also be exerted even in each embodiment of the image decoding method that will be described in detail below.

Figure 27:
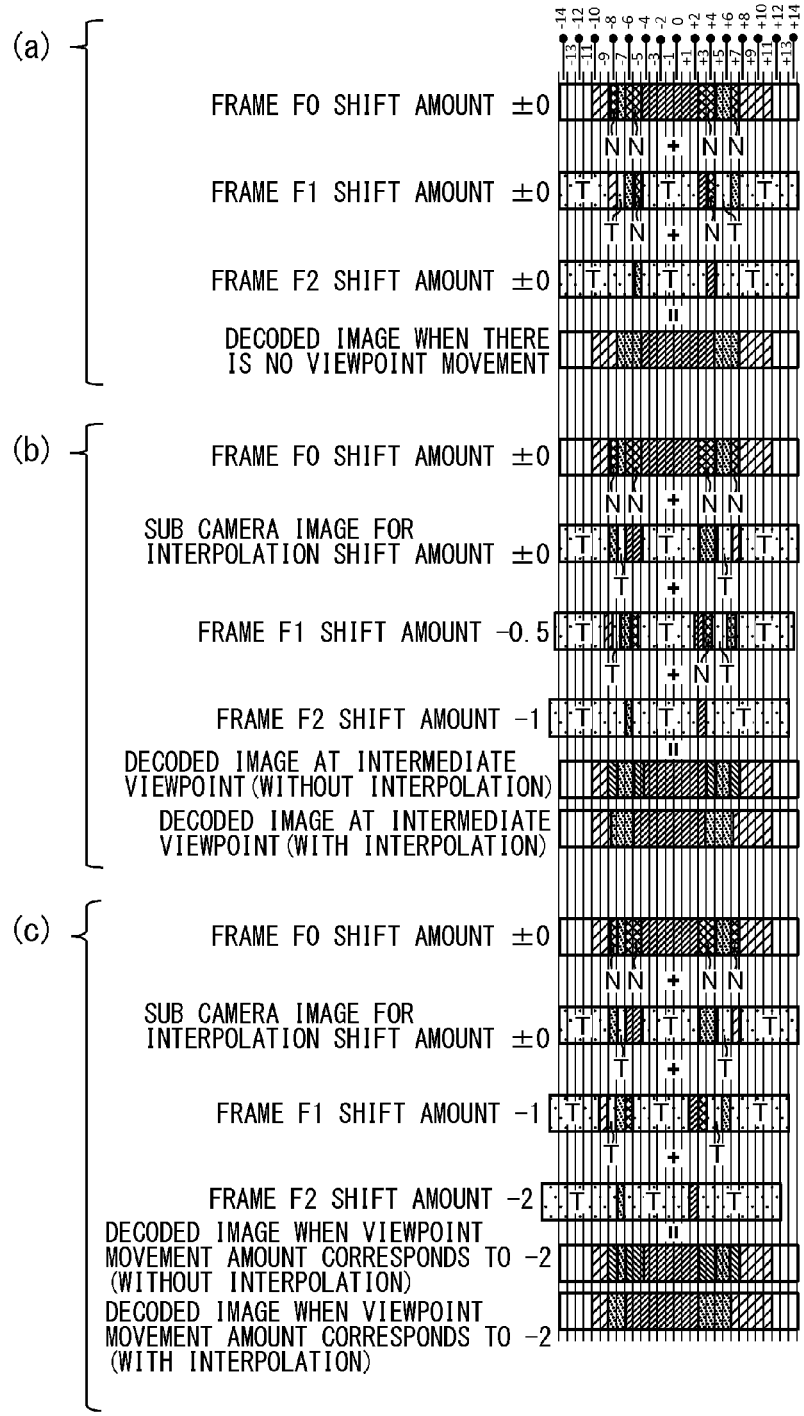
FIG. 27 is a diagram for illustrating an example of a processing procedure by the image decoding method according to the present embodiment.

FIG. 27 is a diagram for illustrating an example of a processing procedure by the image decoding method according to the present embodiment, which are those for illustrating a processing procedure of decoding when two cameras are horizontally located.

In other words, FIG. 27 is those for illustrating a procedure for performing decoding processing in the frames F0 to F2 depicted in FIG. 14(*b*) described above, obtained by the encoding method of the first embodiment in which the main camera MC and the sub camera SC are aligned in the horizontal direction.

FIG. 27(*a*) depicts a viewpoint image decoding of the main camera MC ($h_x=0$); FIG. 27(*b*) depicts decoding of a viewpoint image of an intermediate position between the main camera MC and the sub camera SC ($h_x$ corresponds to d/2); and FIG. 27(*c*) depicts decoding of a viewpoint image of the sub camera SC ($h_x$ corresponds to d).

In FIG. 27, since the movement is made only in the horizontal direction, $h_y=0$ holds all the times. In addition, for simplifying the description, the above first shift amount change (the shift of the entire screen according to the viewpoint position) will be ignored, and a description will be given of the second shift amount change (the shift of each frame).

First, as depicted in FIG. 27(*a*), in the viewpoint image decoding of the main camera MC, hx=hy=0 holds and N regions of the frame F0 are compensated by P regions in the frames F1 and F2, as a result of which an image without any viewpoint movement (a main camera image $PIC_m$) is decoded.

When there is no viewpoint movement, any missing pixels due to the movement of a parallax portion do not occur. Accordingly, the result does not vary with the presence or absence of the image decoding method of the sixth embodiment corresponding to the image encoding method of the fourth embodiment described above.

Next, as depicted in FIG. 27(*b*), in decoding a viewpoint image of an intermediate position between the main camera MC and the sub camera SC ($h_x$ corresponds to d/2), due to its exactly intermediate viewpoint, it is enough to only shift the image to a minus (−) side opposite to a plus (+) side in the viewpoint movement direction by a half of the shift amount at the time of encoding.

In addition, the shift amount per one time in encoding is "1". Thus, according to it, pixels in the frame F1 are shifted by $-\frac{1}{2}=-0.5$, and pixels in the frame F2 are shifted by $-2/2=-1$.

Due to the shift in the frames F1 and F2, there occur regions without pixel data. However, such regions may be interpolated by applying the image decoding method of the sixth embodiment described above (interpolation on missing pixels that occur in viewpoint movement). As a result, for example, there may be obtained a decoded image (decoded image data: processing result frame $F_{pr}$) in which the object OB is shifted by 0.5 in the minus direction and the object OC is shifted by 1 in the minus direction.

Furthermore, as depicted in FIG. 27(*c*), in decoding a viewpoint image of the sub camera SC ($h_x$ corresponds to d), since the viewpoint is the same as the position of the sub camera SC, it is enough to only shift in the minus direction by the same shift amount as the shift amount at the time of encoding.

Specifically, pixels in the frame F1 are shifted by −1, and pixels in the frame F2 are shifted by −2. As a result, there may be obtained decoded image data in which the object OB is moved by 1 in the minus direction and the object OC is moved by 2 in the minus direction.

Figure 28:
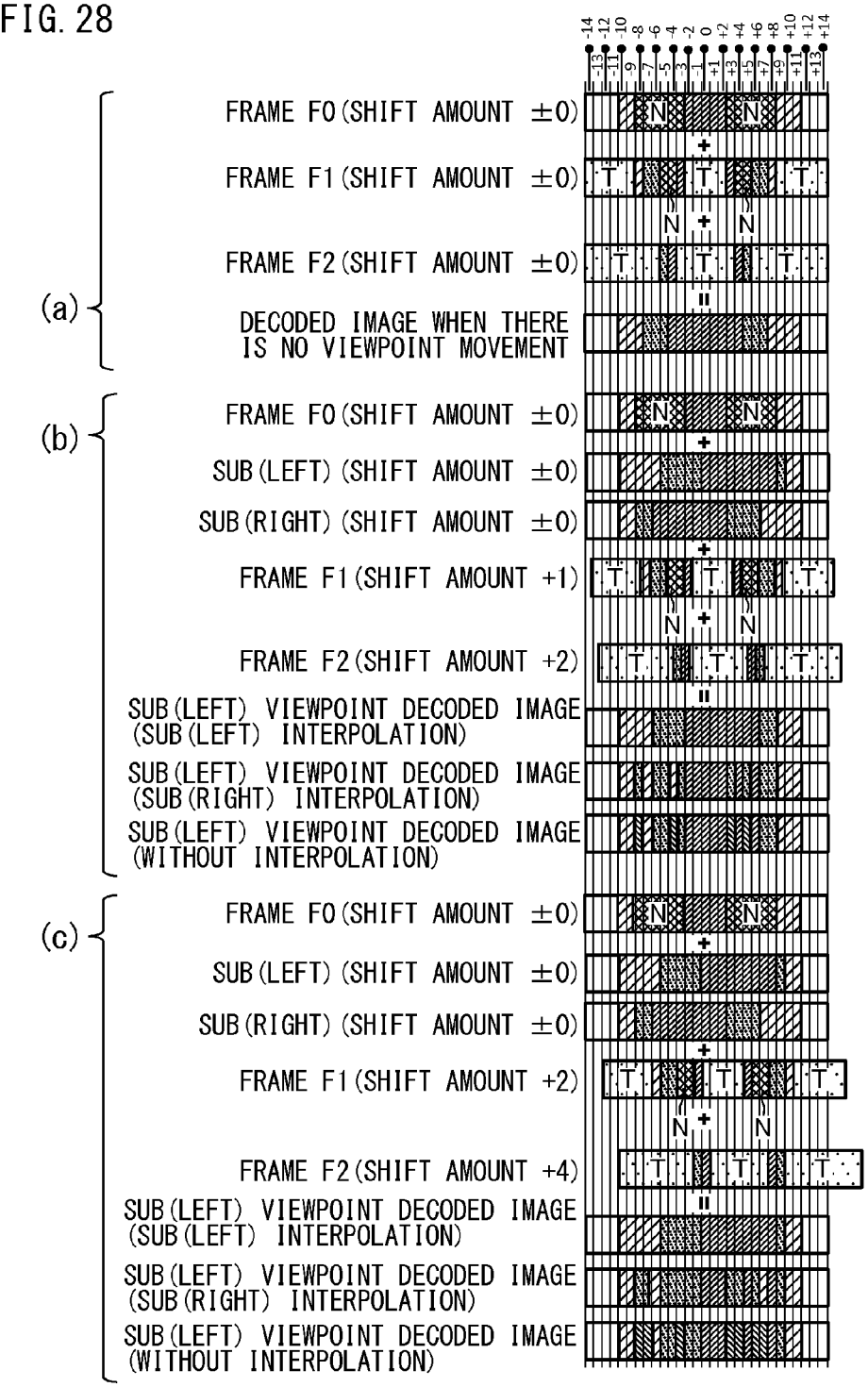
FIG. 28 is a diagram (1) for illustrating an other example of the processing procedure by the image decoding method according to the present embodiment.
Figure 29:
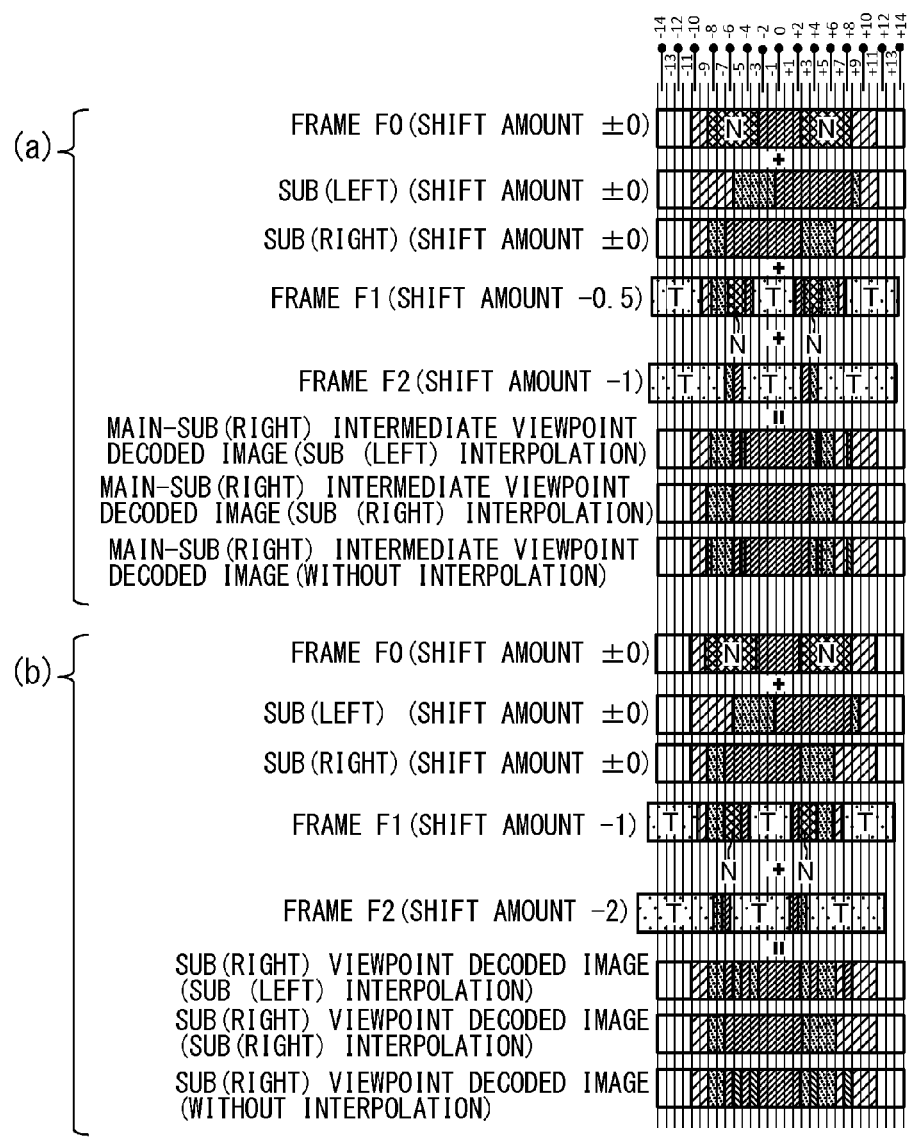
FIG. 29 is a diagram (2) for illustrating the other example of the processing procedure by the image decoding method according to the present embodiment.

FIG. 28 and FIG. 29 are diagrams for illustrating another example of a processing procedure by the image decoding method according to the present embodiment, which are those for illustrating a processing procedure of decoding when three cameras are horizontally located.

Specifically, FIG. 28 and FIG. 29 illustrate a procedure for performing decoding processing in the frames F0 to F2 depicted in FIG. 16(b), obtained by the encoding method of the second embodiment in which the three cameras are arranged on the straight line in the horizontal direction (sub (left) $SC_L$/main MC/sub (right) $SC_R$). First, FIG. 28 will be referred to describe a case without viewpoint movement and a case with leftward viewpoint movement, followed by a description of a case with rightward viewpoint movement by referring to FIG. 29.

FIG. 28(a) depicts decoding of a viewpoint image of the main camera MC ($h_x=0$), and FIG. 28(b) depicts decoding of a viewpoint image of an intermediate position between the main camera MC and the sub (left) camera $SC_L$ ($h_x$ corresponds to −d). Additionally, FIG. 28(c) depicts decoding of a viewpoint image of the sub (left) camera $SC_L$ ($h_x$ corresponds to −2d).

In the case without viewpoint movement and the case with the leftward viewpoint movement, the viewpoint is positioned on a line segment that connects the main camera MC and the sub (left) camera $SC_L$. Accordingly, interpolation processing for missing pixels in viewpoint movement (the image decoding method of the sixth embodiment) is performed by using the image $PIC_{SL}$ captured by the sub (left) camera $SC_L$.

In addition, FIG. 29(a) depicts decoding of a viewpoint image of the intermediate position between the main camera MC and the sub (right) camera $SC_R$ ($h_x$ corresponds to −d/2), and FIG. 29(b) depicts decoding of a viewpoint image of the sub (right) camera $SC_R$ ($h_x$ corresponds to −d).

When the viewpoint is moved in the right direction, the viewpoint is positioned on a line segment that connects the main camera MC and the sub (right) camera $SC_R$. Accordingly, interpolation processing for missing pixels in the viewpoint movement is performed by using the image $PIC_{SR}$ captured by the sub (right) camera $SC_R$.

In addition, in FIG. 28 and FIG. 29 as well, the movement is performed only in the horizontal direction, and thus $h_y=0$ holds all the time. Additionally, for simplifying the description, the above first shift amount change (the shift of the entire screen according to the viewpoint position) will be ignored, and the second shift amount change (the shift of each frame) will be described.

First, as depicted in FIG. 28(a), in decoding the viewpoint image of the main camera MC, hx=hy=0 holds, and N regions of the frame F0 are compensated by P regions in the frames F1 and F2, as a result of which an image without any viewpoint movement (a main camera image $PIC_m$) is decoded.

When there is no viewpoint movement, any missing pixels due to the movement of a parallax portion do not occur. Accordingly, the result does not vary with the presence or absence of the image decoding method of the sixth embodiment corresponding to the image encoding method of the fourth embodiment described above.

In addition, as depicted in FIG. 28(b), in decoding a viewpoint image of the intermediate position between the main camera MC and the sub (left) camera $SC_L$ ($h_x$ corresponds to −d), the shift amount per one time in the image of the sub (left) camera $SC_L$ is "2" and the viewpoint movement distance is a half of the distance to the sub (left) camera $SC_L$.

Accordingly, pixels in the frame F1 are shifted by (2×1)/2=1, and the frame F2 is shifted by (2×2)/2=2. As a result, when interpolated by the sub (left) camera $SC_L$, for example, there may be obtained decoded image data in which the object OB is moved by 1 in the plus direction and the object OC is moved by 2 in the plus direction. Use of the image $PIC_{SR}$ from the sub (right) camera $SC_R$ in interpolation causes damage to the image (decoded image data).

Furthermore, as depicted in FIG. 28(c), in decoding a viewpoint image of the sub (left) camera $SC_L$ ($h_x$ corresponds to −2d), the viewpoint movement distance is twice the intermediate viewpoint. Thus, pixels in the frame F1 are shifted by (2×2)/2=2, and pixels in the frame F2 are shifted by (2×4)/2=4.

As a result, when interpolated by the sub (left) camera $SC_L$, for example, there may be obtained decoded image data in which the object OB is moved by 2 in the plus direction and the object OC is moved by 4 in the plus direction. In this case as well, use of the image $PIC_{SR}$ from the sub (right) camera $SC_R$ in interpolation causes damage to the image.

Next, a description will be given of a case with leftward viewpoint movement. In this case, since the viewpoint is positioned on a line segment that connects the main camera MC and the sub (right) camera $SC_R$, the image $PIC_{SR}$ captured by the sub (right) camera $SC_R$ will be used.

As depicted in FIG. 15 described above, since the distance between the main camera MC and the sub (left) camera $SC_L$ is 2d, the viewpoint may be moved up to −2d. However, since the distance between the main camera MC and the sub (right) camera $SC_R$ is d, the viewpoint movement distance range is 0 to d. Even when the viewpoint is moved out of the range of 0 to d, decoded image data (image) may be generated, but a region that is damaged will be larger.

As depicted in FIG. 29(a), in decoding a viewpoint image of the intermediate position between the main camera MC and the sub (right) camera $SC_R$ ($h_x$ corresponds to −d/2), the shift amount per one time in the image of the sub (right) camera $SC_R$ is "1" and the viewpoint movement distance is a half of the distance to the sub (right) camera $SC_R$.

Accordingly, pixels in the frame F1 are shifted by (−1×1)/2=−0.5, and pixels in the frame F2 are shifted by (−1×2)/2=−1. As a result, when interpolated by the sub (right) camera $SC_R$, for example, there may be obtained decoded image data in which the object OB is moved by 0.5 in the minus direction and the object OC is moved by 1 in the minus direction. Use of the image $PIC_{SL}$ from the sub (left) camera $SC_L$ in interpolation causes damage to the image.

Then, as depicted in FIG. 29(b), in decoding a viewpoint image of the sub (right) camera $SC_R$ ($h_x$ corresponds to −d), the viewpoint movement distance is twice that of the intermediate frame. Thus, pixels in the frame F1 are shifted by −1×1=−1, and pixels in the frame F2 are shifted by −1×2=−2.

As a result, when interpolated by the sub (right) camera $SC_R$, for example, there may be obtained decoded image data in which the object OB is moved by 1 in the minus direction and the object OC is moved by 2 in the minus direction. In this case as well, use of the image $PIC_{SL}$ from the sub (left) camera $SC_L$ in interpolation causes damage to the image.

Figure 30:
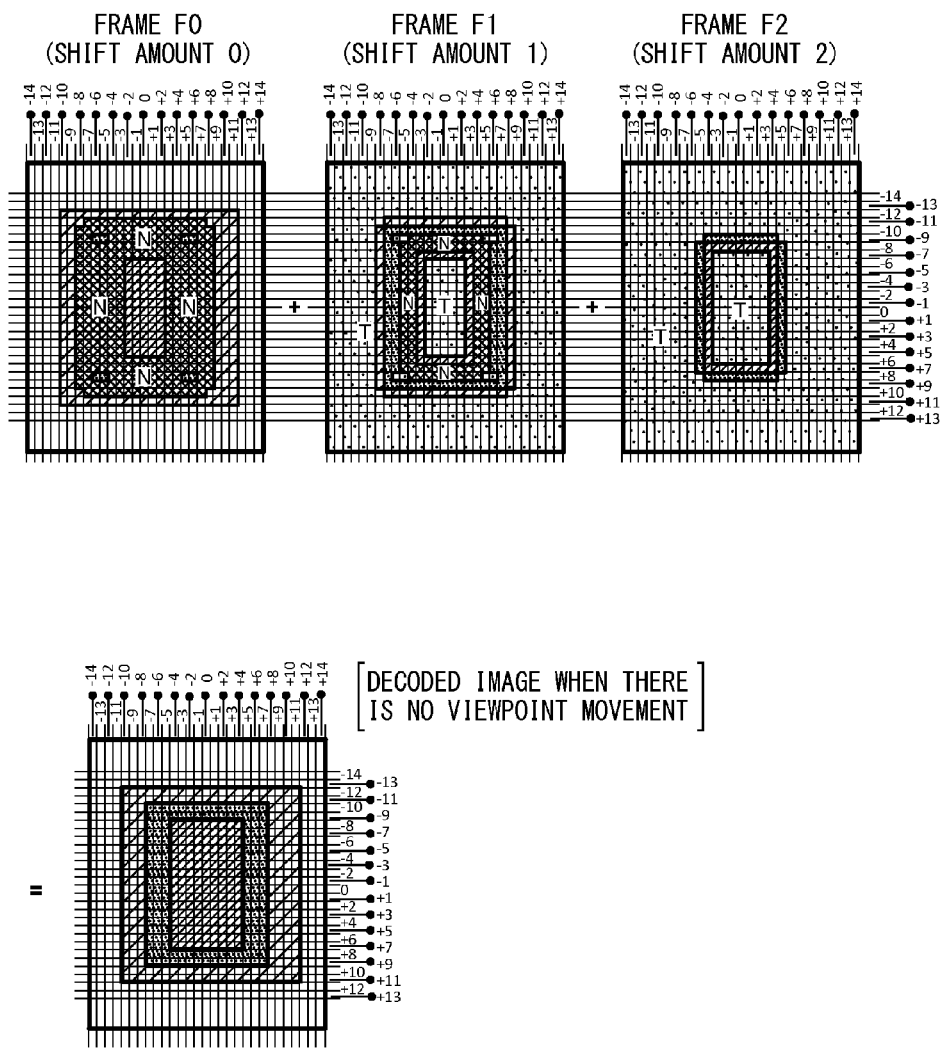
FIG. 30 is a diagram (1) for illustrating still another example of the processing procedure by the image decoding method according to the present embodiment.
Figure 31:
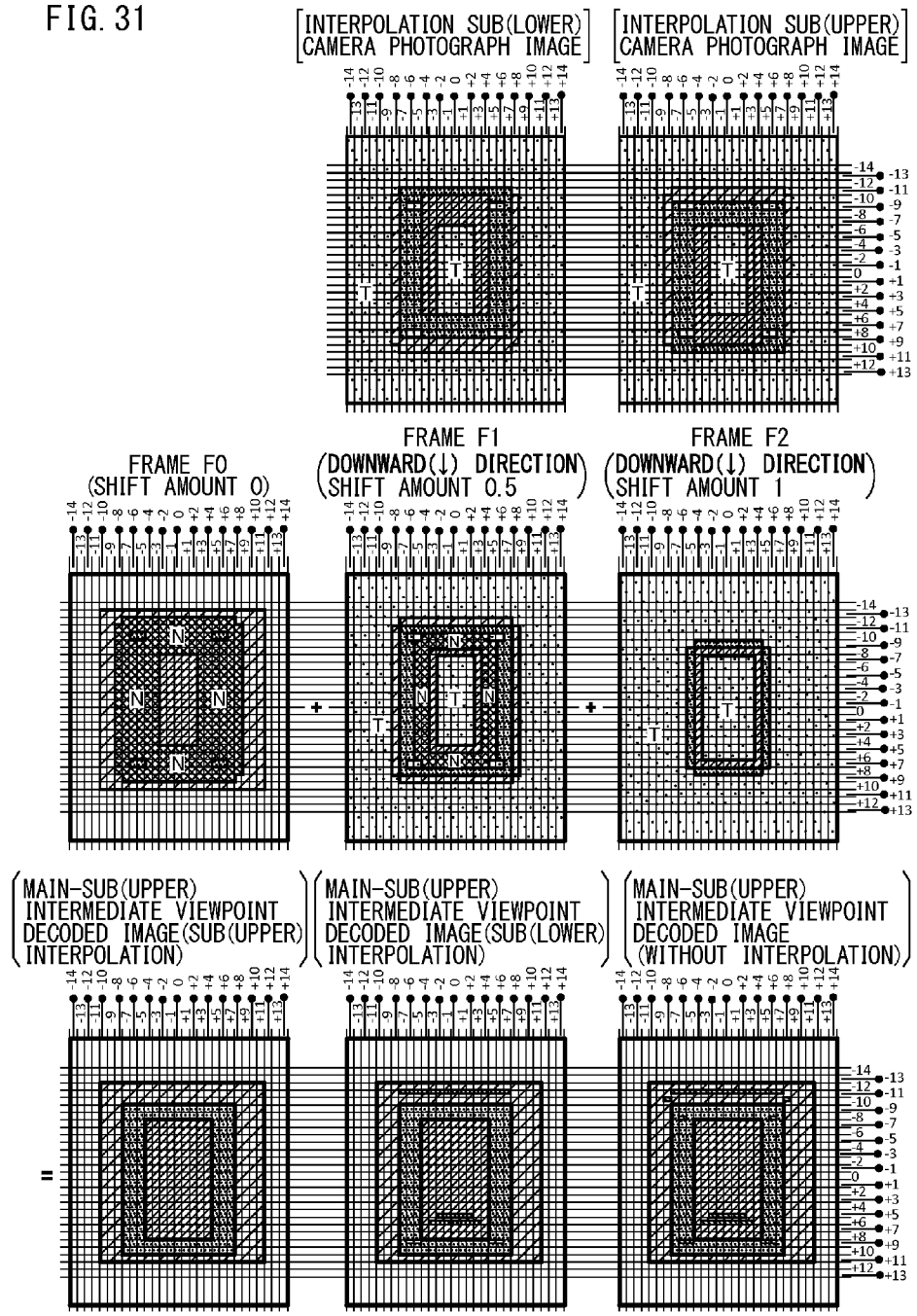
FIG. 31 is a diagram (2) for illustrating the still another example of the processing procedure by the image decoding method according to the present embodiment.

FIG. 30 to FIG. 32 are diagrams for illustrating still another example of the processing procedure by the image decoding method according to the present embodiment, which are those for illustrating a processing procedure of decoding when five cameras are located in a crossing manner.

Specifically, in FIG. 30 to FIG. 32, the procedure is for decoding data obtained by the encoding method of the second embodiment in which the sub (left) camera $SC_L$ is located on the left side of the main camera MC, the sub (right) camera $SC_R$ is located on the right side thereof, the sub (upper) camera $SL_U$ is located on the upper side thereof, and the sub (lower) camera $SL_D$ is located on the lower side thereof. In other words, FIG. 30 to FIG. 32 illustrate a procedure for performing decoding processing in frames F0 to F2 depicted in FIG. 19 described above.

FIG. 30 depicts decoded images when there is no viewpoint movement ($h_x=h_y=0$)(a viewpoint decoded image, decoded image data), and FIG. 31 depicts decoded images when the viewpoint is moved in an intermediate position between the main camera MC and the sub (upper) camera $SC_U$ ($h_y$ corresponds to $-d/2$). In addition, FIG. 32 depicts decoded images when the viewpoint is moved in the intermediate position between the main camera MC and the sub (upper) camera $SC_U$ ($h_y$ corresponds to $-d$).

First, as depicted in FIG. 30, when there is no viewpoint movement ($h_x=h_y=0$), overwrite drawing is performed in order of the frame F0, F1, and F2. Thereby, basically, as with the description given by referring to FIG. 27 to FIG. 29, the image captured by the main camera MC (the main camera image $PIC_m$) may be decoded (restored).

Next, as depicted in FIG. 31, when the viewpoint is moved in the intermediate position between the main camera MC and the sub (upper) camera $SC_u$ ($h_y$ corresponds to $-d/2$), the viewpoint is positioned on a line segment that connects the main camera MC and the sub (upper) camera $SC_u$. Accordingly, interpolation uses the image $PIC_{SU}$ from the sub (upper) camera $SC_U$. Since the shift amount per one time is "1" and the viewpoint is moved in a position of a half of the amount. Thus, pixels in the frame F1 are shifted by 0.5 in the lower direction, and pixels in the frame F2 are shifted by 1 in the lower direction.

Then, when the image $PIC_{SU}$ from the sub (upper) camera $SC_U$ is used in interpolation, there may be obtained decoded image data in which the object OB is moved by 0.5 in the lower direction and the object OC is moved by 1 in the lower direction. Use of an image other than the image $PIC_{SU}$ from the sub (upper) camera $SC_U$ in interpolation results in damage to the decoded image.

Furthermore, as depicted in FIG. 32, when the viewpoint is moved in the intermediate position between the main camera MC and the sub (upper) camera $SC_U$ ($h_x$ corresponds to $-d$), the viewpoint is twice the intermediate viewpoint. Thus, pixels in the frame F1 are shifted by 1 in the lower direction, and pixels in the frame F2 are shifted by 2 in the lower direction.

Then, when the image $PIC_{SU}$ from the sub (upper) camera $SC_U$ is used in interpolation, there may be obtained decoded image data in which the object OB is moved by 1 in the lower direction and the object OC is moved by 2 in the lower direction. In this case as well, use of an image other than the image $PIC_{SU}$ from the sub (upper) camera $SC_U$ in interpolation causes damage to the image.

As described above, when performing interpolation, a image from a sub camera according to viewpoint movement is used. Use of a image from a sub camera other than that in interpolation leads to damage to image.

In the decoding method of the present embodiments, when there are provided a plurality of camera sets (camera groups) by using the camera set (the camera group) including the main camera and the sub cameras illustrated as the image encoding method of the third embodiments described above, the above-described decoding processing will be performed on each of the camera groups.

As described in detail hereinabove, the image encoding method and the image encoding apparatus according to the present embodiments allow reduction in the amount of calculation and the amount of data.

Thereby, encoding (generation/recording) and decoding (reproduction) of a minute viewpoint movement-adapted image may easily be achieved, for example, even by a built-in apparatus having limited calculation processing ability and storage capacity, or the like. Furthermore, the image encoding method and the image decoding method according to the present embodiments may also be achieved as an image encoding program and an image decoding program that are executed by a central processing unit.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

Various aspects and embodiments of the present invention are defined by the following numbered clauses:

[Clause 1] An image decoding method for generating a decoded image corresponding to a viewpoint position on a basis of viewpoint position information by a plurality of frames that comprise a plurality of two-dimensional images encoded from three-dimensional image information based on a main camera image from at least one main camera and a sub camera image from at least one sub camera provided with respect to the main camera, the at least one main camera and the at least one sub camera being provided in the same plane, the image decoding method performing overwrite drawing in the plurality of encoded frames by shifting by a calculated shift amount in the same order as a generation order at a time of encoding to decode a viewpoint image corresponding to the viewpoint position.

[Clause 2] The image decoding method as claimed in clause 1, wherein the plurality of frames includes:

a first frame for receiving the main camera image and the sub camera image simultaneously captured and comparing pixel values of pixels at the same coordinates in the main camera image and the sub camera image to regard as being the same object in case of a difference between the pixel values of the pixels at the same coordinates is not more than a predetermined threshold value, recording as a surface region, and recording a region not filled with any pixel value as a back region; and a second frame different from the first frame, for recording the surface region and the back region by pixel-shifting the sub camera image by a direction and a shift amount based on a positional relationship between the main camera and the sub camera and comparing again pixel values of pixels at the same coordinates in the main camera image and the sub camera image.

[Clause 3] The image decoding method as claimed in clause 2, wherein the viewpoint image is decoded without performing overwrite drawing of pixels set as the back region.

[Clause 4] The image decoding method as claimed in clause 2, wherein
the recording into the second frame includes recording of a transparent region for coordinates that is included in the surface region at a time of a previous frame.

[Clause 5] The image decoding method as claimed in clause 4, wherein the viewpoint image is decoded without performing overwrite drawing of pixels set as the transparent region.

[Clause 6] The image decoding method as claimed in clause 3, wherein
the recording into the second frame includes recording of the back region in the first frame and a pixel value at coordinates of the back region in a sub camera image captured by a sub camera, and
a shortage of drawing data of a background portion in the viewpoint movement is relieved by the pixel value of the sub camera image recorded in the second frame.

[Clause 7] The image encoding method as claimed in clause 6, wherein the sub camera image that is used to relieve the shortage of drawing data of the background portion in the viewpoint movement is determined on a basis of the viewpoint movement.

[Clause 8] An image decoding apparatus comprising:
a decoding unit configured to generate a decoded image corresponding to a viewpoint position on a basis of viewpoint position information by a plurality of frames configured to comprise a plurality of two-dimensional images encoded from three-dimensional image information based on a main camera image from at least one main camera and a sub camera image from at least one sub camera provided with respect to the main camera, the at least one main camera and the at least one sub camera being provided in the same plane, wherein
the decoding unit is configured to shift by a calculated shift amount in the plurality of encoded frames in the same order as a frame generation order at a time of encoding to perform overwrite drawing in the frames, so as to decode a viewpoint image corresponding to the viewpoint position.

[Clause 9] The image decoding apparatus as claimed in clause 8, wherein the viewpoint position information is an output of a viewer viewpoint position detection device attached to a display device or provided near the display device.

[Clause 10] A computer-readable storing medium storing an image decoding program for generating a decoded image corresponding to a viewpoint position on a basis of viewpoint position information by a plurality of frames that comprises a plurality of two-dimensional images encoded from three-dimensional image information based on a main camera image from at least one main camera and a sub camera image from at least one sub camera provided with respect to the main camera, the at least one main camera and the at least one sub camera being provided in the same plane, the program causing a central processing unit to execute:
shifting by a calculated shift amount in the plurality of encoded frames in the same order as a frame generation order at a time of encoding to perform overwrite drawing in the frames, so as to decode a viewpoint image corresponding to the viewpoint position.

What is claimed is:
1. An image encoding method for an encoding system comprising:
receiving a first image captured by a main camera and a second image captured simultaneously with the first image by a sub camera provided in the same plane with the main camera;
comparing pixel values of pixels at first coordinates of each of the first image and the second image to obtain a first difference value;
determining that the first coordinates are in a surface region in case of the first difference value is not more than a first threshold value, and that the coordinates are in a back region in case of the first difference value is more than the first threshold value, and recording into a first frame;
pixel-shifting the second image by a first shift amount in a direction based on a positional relationship between the main camera and the sub camera; and
comparing the pixel value of the pixel at the first coordinates of the first image with a pixel value of a pixel at the first coordinates of the second image after the pixel shift to obtain a second difference value, determining whether the first coordinates are in the surface region or the back region on a basis of the second difference value, and recording into a second frame different from the first frame.

2. The image encoding method as claimed in claim 1, wherein,
in the recording into the second frame,
the coordinates, whose region are recorded as the surface region into the first frame, are recorded as a transparent region.

3. The image encoding method as claimed in claim 1, wherein,
in the recording into the first frame,
a pixel value at the coordinates recorded as the back region in the second image is recorded.

4. The image encoding method as claimed in claim 1, the image encoding method further comprising:
determining a presence or absence of the back region in the second frame, and further pixel-shifting the second image by the first shift amount in the direction in case of determining that the back region exists;
comparing the pixel value of the pixel at the first coordinates of the first image with a pixel value of a pixel at the first coordinates of the second image after the further image shift to obtain a third difference value, determining whether the first coordinates are in the position region or the back region on a basis of the third difference value, and recording into a third frame different from the first frame and the second frame.

5. The image encoding method as claimed in claim 1, wherein
the sub camera is provided in plural numbers, and
each of the sub cameras is located so that two or more of the sub cameras are not on the same straight line as long as the main camera is not located between the sub cameras.

6. The image encoding method as claimed in claim 5, wherein the encoding system comprises two sub cameras where the main camera is provided therebetween and aligned on a straight line in a horizontal direction.

7. The image encoding method as claimed in claim 1, wherein the encoding system includes a plurality of the sub cameras.

8. The image encoding method as claimed in claim 7, wherein
the plurality of sub cameras include a first camera group and a second camera group adjacent in the same plane; and
the main camera in the first camera group is also used as the sub camera in the second camera group or
the sub camera in the first camera group is also used as the sub camera in the second camera.

9. An image encoding apparatus for an encoding system comprising:
  a central processing unit
  a memory storing a program to cause the processor to perform:
  receiving a first image captured by a main camera and a second image captured simultaneously with the first image by a sub camera provided in the same plane with the main camera;
  comparing pixel values of pixels at first coordinates of each of the first image and the second image to obtain a first difference value;
  determining that the first coordinates are in a surface region in case of the first difference value is not more than a first threshold value, and that the coordinates are in a back region in case of the first difference value is more than the first threshold value, and recording into a first frame;
  pixel-shifting the second image by a first shift amount in a direction based on a positional relationship between the main camera and the sub camera; and
  comparing the pixel value of the pixel at the first coordinates of the first image with a pixel value of a pixel at the first coordinates of the second image after the pixel shift to obtain a second difference value, determining whether the first coordinates are in the surface region or the back region on a basis of the second difference value, and recording into a second frame different from the first frame.

10. A non-transitory computer-readable storing medium storing an image encoding program causing a central processing unit to execute:
  receiving a first image captured by a main camera and a second image captured simultaneously with the first image by a sub camera provided in the same plane with the main camera;
  comparing pixel values of pixels at first coordinates of each of the first image and the second image to obtain a first difference value;
  determining that the first coordinates are in a surface region in case of the first difference value is not more than a first threshold value, and that the coordinates are in a back region in case of the first difference value is more than the first threshold value, and recording into a first frame;
  pixel-shifting the second image by a first shift amount in a direction based on a positional relationship between the main camera and the sub camera; and
  comparing the pixel value of the pixel at the first coordinates of the first image with a pixel value of a pixel at the first coordinates of the second image after the pixel shift to obtain a second difference value, determining whether the first coordinates are in the surface region or the back region on a basis of the second difference value, and recording into a second frame different from the first frame.

* * * * *